US00RE50499E

(19) United States
(12) Reissued Patent
Yamanashi

(10) Patent Number: US RE50,499 E
(45) Date of Reissued Patent: Jul. 22, 2025

(54) SEWING MACHINE

(71) Applicant: BROTHER KOGYO KABUSHIKI KAISHA, Nagoya (JP)

(72) Inventor: Yoko Yamanashi, Konan (JP)

(73) Assignee: BROTHER KOGYO KABUSHIKI KAISHA, Nagoya (JP)

(21) Appl. No.: 17/725,033

(22) Filed: Apr. 20, 2022

Related U.S. Patent Documents

Reissue of:
(64) Patent No.: 10,626,533
Issued: Apr. 21, 2020
Appl. No.: 16/125,021
Filed: Sep. 7, 2018

(30) Foreign Application Priority Data

Sep. 27, 2017 (JP) ..... 2017-186046

(51) Int. Cl.
*D05B 19/10* (2006.01)
*D05B 19/08* (2006.01)
*D05C 9/22* (2006.01)

(52) U.S. Cl.
CPC ..... *D05B 19/10* (2013.01); *D05B 19/08* (2013.01); *D05C 9/22* (2013.01); *D05D 2205/16* (2013.01)

(58) Field of Classification Search
CPC ..... D05B 19/10; D05C 9/22; D05D 2205/16
USPC ..... 112/102.5, 475.19
See application file for complete search history.

(56) References Cited

U.S. PATENT DOCUMENTS 5,054,408 A * 10/1991 Hayakawa ..... G05B 19/40932 700/138
5,195,442 A * 3/1993 Meier ..... D05B 19/10 112/454
5,195,451 A * 3/1993 Nakashima ..... D05B 21/00 112/102.5
5,205,232 A * 4/1993 Sadeh ..... A43D 119/00 112/475.03
5,588,216 A * 12/1996 Rank ..... G01B 11/27 33/286
5,748,480 A * 5/1998 Mizuno ..... D05B 19/08 112/470.07
5,865,134 A * 2/1999 Okuyama ..... D05B 19/06 112/300
5,896,822 A * 4/1999 Futamura ..... D05B 19/08 112/102.5
5,943,972 A * 8/1999 Hirata ..... D05B 19/10 112/102.5

(Continued)

FOREIGN PATENT DOCUMENTS

JP H03-236891 A 10/1991
JP H05-269275 A 10/1993

*Primary Examiner* — William C Doerrler
(74) *Attorney, Agent, or Firm* — Oliff PLC

(57) ABSTRACT

A sewing machine sews a sewing pattern on a work cloth. The sewing machine includes a storage portion configured to store pattern data used for sewing the sewing pattern on the work cloth, and a projector configured to project an image. The sewing machine generates, on the basis of the pattern data, a projection image that includes a pattern object and a peripheral object. The pattern object represents the sewing pattern. The peripheral object is disposed adjacent to an outer edge of the pattern object and surrounds the pattern object. The sewing machine controls the projector and projecting the generated projection image toward a top surface of a bed portion on which the work cloth is placed.

39 Claims, 17 Drawing Sheets

(56) References Cited

U.S. PATENT DOCUMENTS

| | | | | | |
|---|---|---|---|---|---|
| 5,947,043 | A * | 9/1999 | Morita | D05C 5/02 | 112/300 |
| 6,032,594 | A * | 3/2000 | Komuro | D05B 19/08 | 112/102.5 |
| 6,161,491 | A * | 12/2000 | Takenoya | D05B 19/02 | 112/102.5 |
| 8,527,083 | B2 * | 9/2013 | Tokura | D05B 19/10 | 112/102.5 |
| 9,070,055 | B2 * | 6/2015 | Miller | G06K 15/027 | |
| 9,109,314 | B2 * | 8/2015 | Maki | D05B 19/02 | |
| 9,127,383 | B2 * | 9/2015 | Yamanashi | D05C 5/02 | |
| 2005/0165506 | A1 * | 7/2005 | Mizuno | D05B 19/10 | 700/138 |
| 2007/0113765 | A1 * | 5/2007 | Asano | D05B 19/10 | 112/2 |
| 2010/0224112 | A1 | 9/2010 | Kahn | D05B 35/12 | 112/475.19 |
| 2011/0226171 | A1 | 9/2011 | Tokura | D05B 19/10 | 112/470.05 |
| 2012/0209417 | A1 * | 8/2012 | Tokura | D05B 21/00 | 112/102.5 |
| 2015/0252503 | A1 | 9/2015 | Tokura | D05B 19/12 | 112/470.01 |
| 2015/0259837 | A1 * | 9/2015 | Tokura | D05B 21/00 | 112/102.5 |
| 2015/0259841 | A1 * | 9/2015 | Ihira | D05B 81/00 | 112/102.5 |
| 2016/0115631 | A1 * | 4/2016 | Elliott | D05B 19/12 | 112/102.5 |

* cited by examiner

SEWING MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This *is a reissue* Application *of U.S. Pat. No. 10,626,533, which was U.S. patent application Ser. No. 16/125,021, filed on Sep. 7, 2018, which* claims priority to Japanese Patent Application No. 2017-186046, filed on Sep. 27, 2017, the content of which is hereby incorporated by reference.

BACKGROUND

The present disclosure relates to a sewing machine.

A sewing machine is known that has an embroidery function that can project a pattern image onto a work cloth. The sewing machine projects the pattern image, using a display light source, on the basis of display data, and displays the pattern image on the work cloth. In this way, the sewing machine can visually present a sewing position of a sewing pattern to a user. Thus, the user can easily perform position alignment of the sewing position of the sewing pattern.

SUMMARY

However, depending on a color tone and a material of the work cloth, the pattern image displayed on the work cloth may be difficult to see.

It is an object of the present disclosure to provide a sewing machine capable of projecting a clear pattern image onto a work cloth, irrespective of the color tone or the material of the work cloth.

Various embodiments herein provide a sewing machine that sews a sewing pattern on a work cloth, including a storage portion configured to store pattern data used for sewing the sewing pattern on the work cloth, a projector configured to project an image, a processor and a memory. The memory configured to store computer-readable instructions. When executed by the processor, the computer-readable instructions instruct the processor to perform processes. The processes include generating, on the basis of the pattern data, a projection image that includes a pattern object and a peripheral object. The pattern object represents the sewing pattern. The peripheral object is disposed adjacent to an outer edge of the pattern object and surrounds the pattern object. The processes further include controlling the projector to project the generated projection image toward a top surface of a bed portion on which the work cloth is placed.

Various embodiments also provide a sewing machine that sews a sewing pattern on a work cloth, including a storage portion configured to store pattern data used for sewing the sewing pattern on the work cloth, a projector configured to project an image, a processor and a memory. The memory configured to store computer-readable instructions. When executed by the processor, the computer-readable instructions instruct the processor to perform processes. The processes include generating, on the basis of the pattern data, a projection image that includes a pattern object and a peripheral object. The pattern object represents the sewing pattern. The border object is disposed adjacent to an outer edge of the pattern object and borders the pattern object. The processes further include controlling the projector to project the generated projection image toward a top surface of a bed portion on which the work cloth is conveyed.

BRIEF DESCRIPTION OF THE DRAWINGS

Embodiments of the disclosure will be described below in detail with reference to the accompanying drawings in which.

DETAILED DESCRIPTION

An embodiment of the present disclosure will be explained with reference to the drawings. The present embodiment is an example of a case in which the present disclosure is applied to a sewing machine that sews a sewing pattern on a work cloth. The sewing patterns of the present embodiment have a practical pattern and an embroidery pattern. The practical pattern is sewn while the work cloth is fed using a feed dog. The practical pattern is formed using practical stitches, such as straight line stitching, zigzag stitching, overcasting stitches, and the like. Further, a decorative pattern is included in the practical pattern. The decorative pattern is formed by a unit pattern being sewn a plurality of times in a continuous manner. The unit pattern is a geometric pattern, such as a triangle or the like, or a schematic pattern, such as a flower design or the like. The embroidery pattern is sewn on the basis of embroidery data, and is formed using embroidery. The embroidery pattern is a sewing pattern of characters, graphics, and the like.

A physical configuration of a sewing machine 1 will be explained with reference to FIG. 1 and FIG. 2. In the following explanation, the upper side, the lower side, the lower left side, the upper right side, the lower right side, and the upper left side in FIG. 1 are, respectively, the upper side, the lower side, the left side, the right side, the front side, and the rear side of the sewing machine 1.

Figure 1:
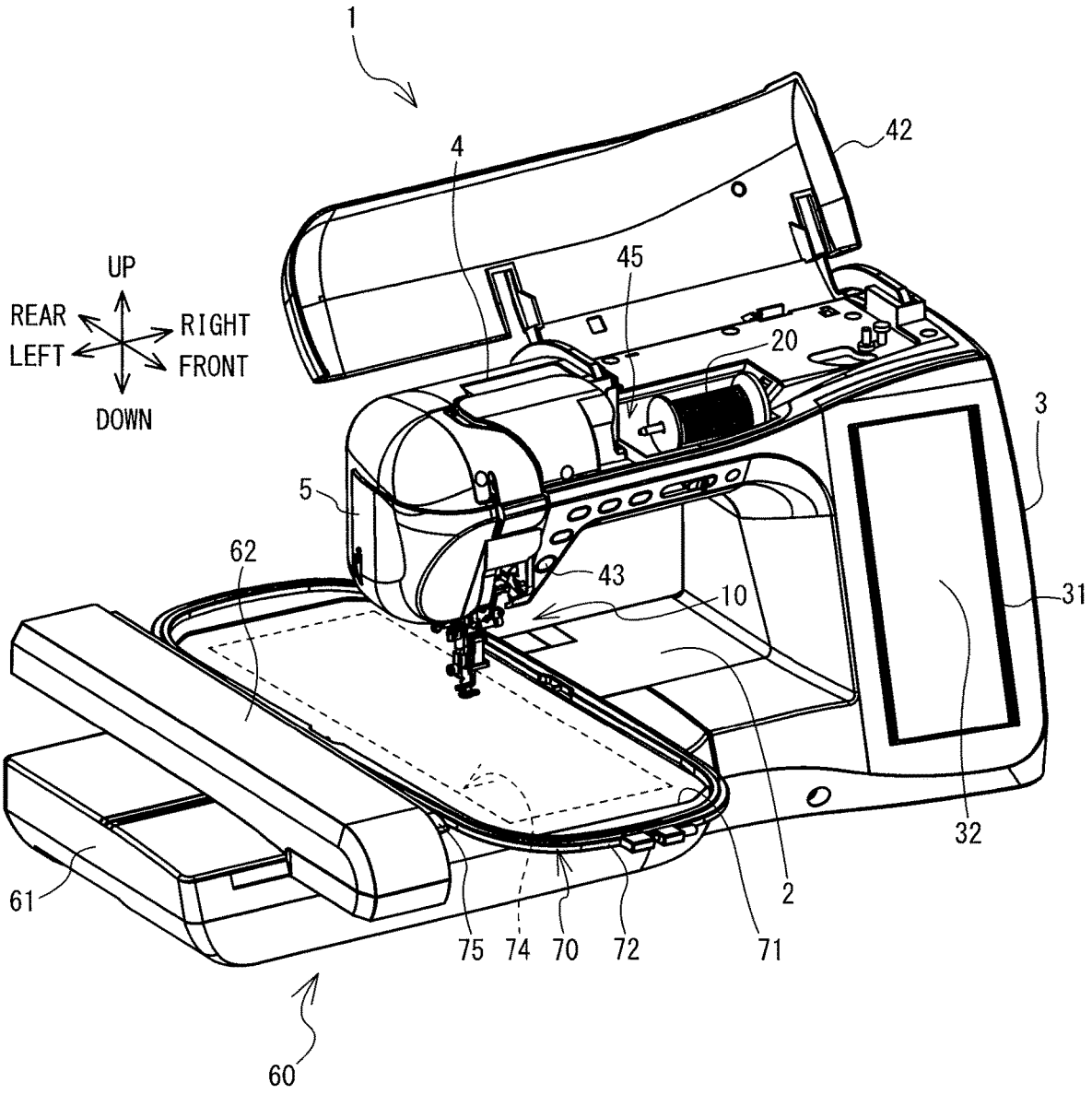
FIG. 1 is a perspective view of a sewing machine.

As shown in FIG. 1, the sewing machine 1 is mainly provided with a bed portion 2, a pillar 3, and an arm portion 4. The bed portion 2 is a base portion of the sewing machine 1, and extends in the left-right direction. The pillar 3 extends upward from the right end portion of the bed portion 2. The arm portion 4 extends to the left from the upper portion of the pillar 3. The left end portion of the arm portion 4 is a head portion 5.

Figure 2:
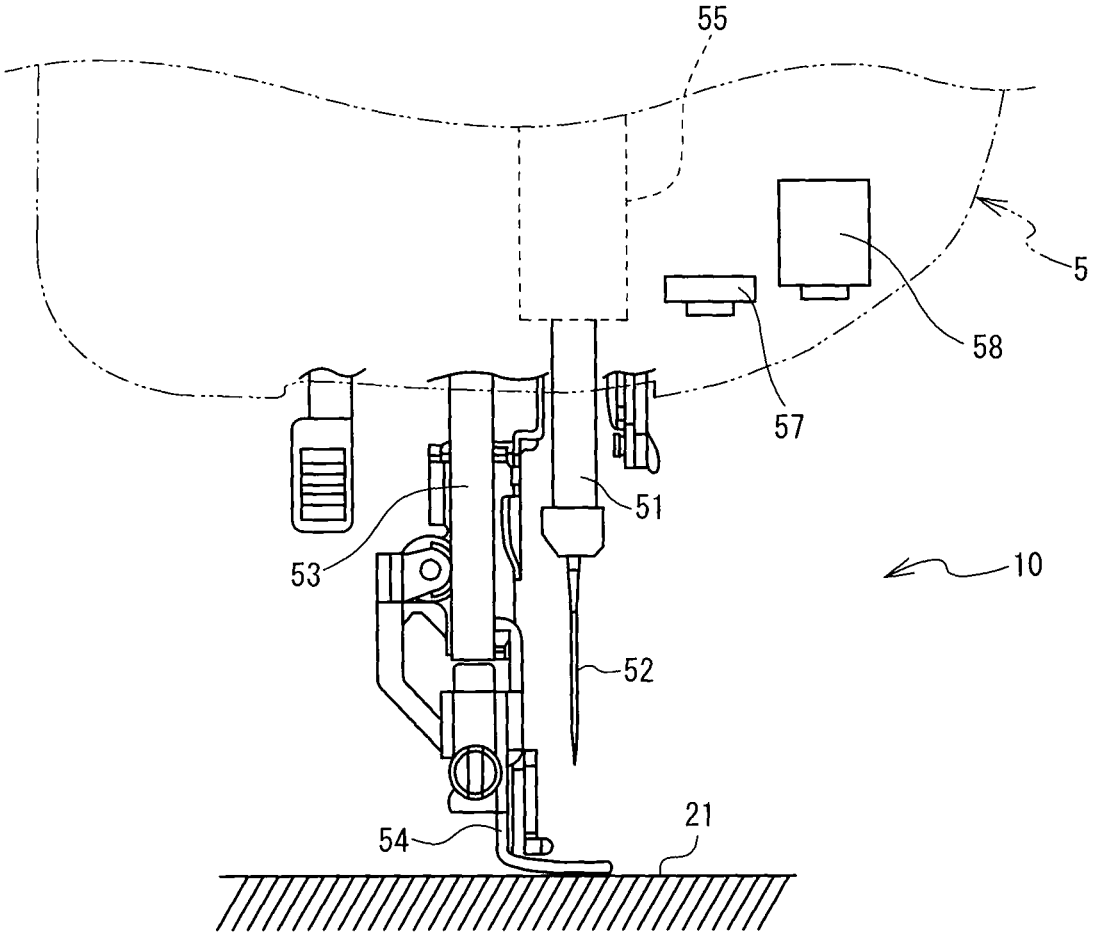
FIG. 2 is a left side view of a lower portion of a head portion.

As shown in FIG. 2, a needle plate 21 is provided on the upper surface of the bed portion 2. The needle plate 21 is disposed below a needle bar 51 provided in the head portion 5. A sewing needle 52 is mounted on the lower end of the needle bar 51. The needle plate 21 has a needle hole (not shown in the drawings) through which the sewing needle 52 can be inserted. At the time of sewing, the leading end of the sewing needle 52 passes through the needle hole in accordance with the up-and-down movement of the needle bar 51. A work cloth (not shown in the drawings) is placed on the upper surface of the bed portion 2 and the needle plate 21. The sewing machine 1 is provided with a sewing mechanism 10. The sewing mechanism 10 forms the sewing pattern on the work cloth. The sewing mechanism 10 includes a needle bar up-down drive mechanism 55, a shuttle mechanism (not shown in the drawings), a feed mechanism (not shown in the drawings), a swinging mechanism (not shown in the drawings), and a movement mechanism 60. The feed mechanism and the swinging mechanism feed the work cloth when sewing the practical pattern. The movement mechanism 60 feeds the work cloth when sewing the embroidery pattern.

The sewing machine 1 is provided with a feed motor 22 (refer to FIG. 3), a lower shaft (not shown in the drawings), the feed mechanism (not shown in the drawings), the shuttle mechanism (not shown in the drawings), and the like, inside the bed portion 2. The feed mechanism is provided with the feed dog. The feed dog feeds the work cloth when the sewing of the practical pattern is performed. The feed motor 22 is a pulse motor. The feed motor 22 adjusts a feed amount and a feed direction when the work cloth is fed by the feed mechanism. The lower shaft is driven to rotate by a drive shaft (not shown in the drawings). The shuttle mechanism is a mechanism having a known structure that is driven in accordance with the rotation of the lower shaft. The shuttle mechanism moves in concert with the sewing needle 52 mounted on the lower end of the needle bar 51, and forms stitches in the work cloth.

As shown in FIG. 1, the work cloth is held by an embroidery frame 70. The movement mechanism 60 can move the work cloth relative to the needle bar 51. The movement mechanism 60 is provided with a main body portion 61 and a carriage 62. The carriage 62 is provided with a frame holder (not shown in the drawings), a Y axis movement mechanism (not shown in the drawings), and a Y axis motor 64 (refer to FIG. 3). The frame holder is provided on the right side surface of the carriage 62. One embroidery frame 70 selected from among a plurality of the embroidery frames 70 having different shapes and sizes can be removably mounted on the frame holder. The Y axis movement mechanism moves the frame holder in the front-rear direction (a Y axis direction). The Y axis motor 64 drives the Y axis movement mechanism.

The embroidery frame 70 includes an inner frame member 71, an outer frame member 72, and an attachment portion 75. The inner frame member 71 and the outer frame member 72 clamp and hold the work cloth. A sewable area 74 that is set on the inside of the embroidery frame 70 is an area in which the sewing machine 1 can form the stitches. The sewable area 74 is set in accordance with the type of the embroidery frame. The attachment portion 75 is a section that is mounted on the frame holder.

Figure 3:
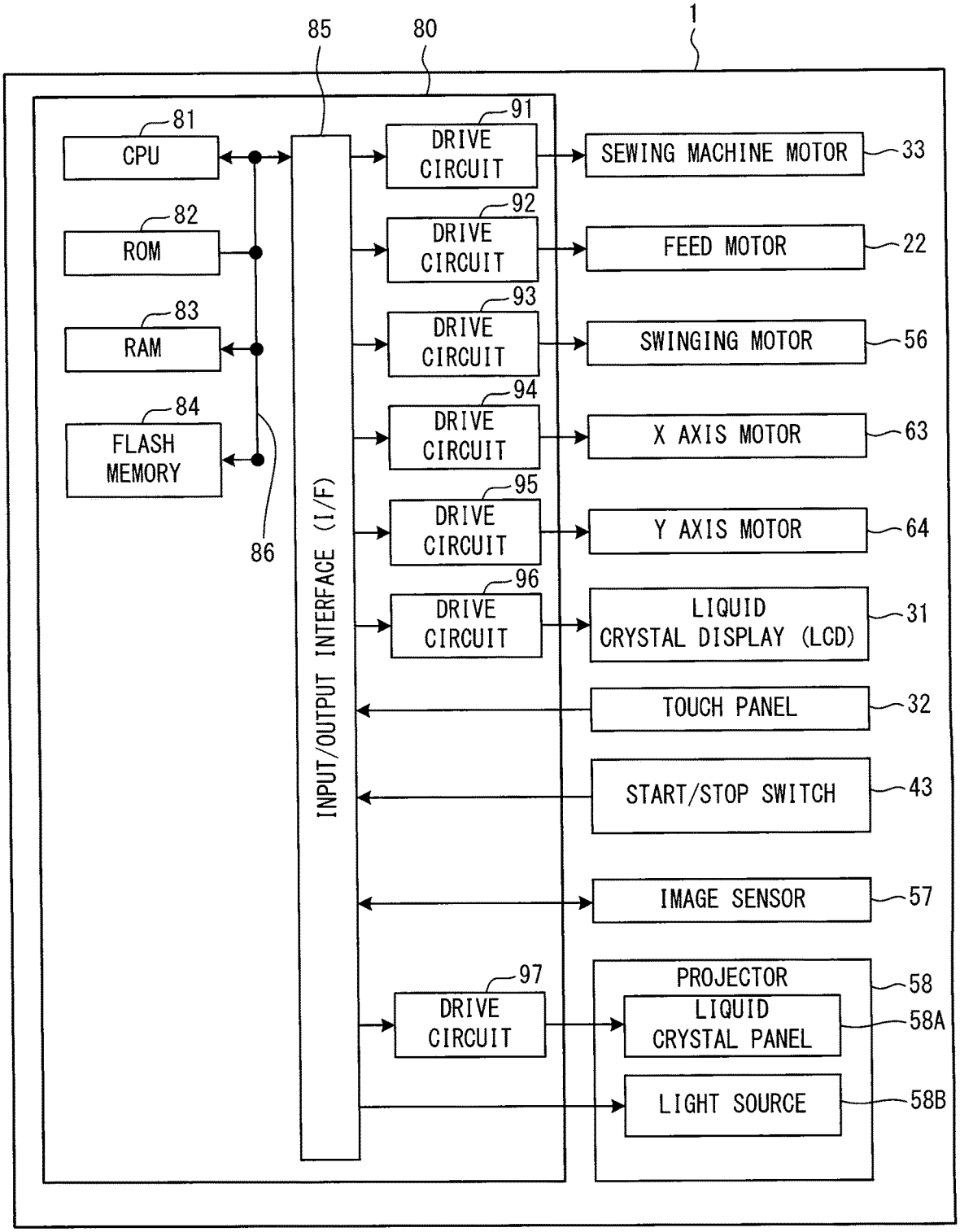
FIG. 3 is a block diagram showing an electrical configuration of the sewing machine.

The main body portion 61 is internally provided with an X axis movement mechanism (not shown in the drawings) and an X axis motor 63 (refer to FIG. 3). The X axis movement mechanism moves the carriage 62 in the left-right direction (an X axis direction). The X axis motor 63 drives the X axis movement mechanism. The movement mechanism 60 can move the embroidery frame 70 mounted on the carriage 62 (more specifically on the frame holder) to a position indicated by a unique XY coordinate system (an embroidery coordinate system).

A liquid crystal display (hereinafter referred to as an "LCD") 31 is provide in the front surface of the pillar 3. Images including various items, such as commands, illustrations, setting values, messages and the like, are displayed on the LCD 31. A touch panel 32 is provided on the front surface side of the LCD 31. The touch panel 32 can detect a position that is approached, touched, or pressed. The touch panel 32 receives input of an operation using a finger or a dedicated touch pen or the like. A CPU 81 (refer to FIG. 3) of the sewing machine 1 recognizes an item selected from the image on the basis of the detected position. Hereinafter, the operation of the touch panel 32 by a user is referred to as a panel operation. By the panel operation, the user can select a pattern that he or she wishes to sew, a command to be performed, and the like.

The pillar 3 is internally provided with a control portion 80 (refer to FIG. 3) of the sewing machine 1, and a sewing machine motor 33 (refer to FIG. 3). The sewing machine motor 33 rotatingly drives the drive shaft (not shown in the drawings) provided inside the arm portion 4. The drive shaft and the lower shaft are coupled by a timing belt (not shown in the drawings). The rotation of the drive shaft is transmitted to the lower shaft. The drive shaft and the lower shaft rotate in synchronization with each other.

An openable/closable cover 42 is provided on the upper portion of the arm portion 4. A thread storage portion 45 is provided below the cover 42. A thread spool 20 around which an upper thread is wound is housed in the thread storage portion 45. During sewing, the upper thread wound around the thread spool 20 is supplied to the sewing needle 52 from the thread spool 20, via a predetermined path provided in the head portion 5. The drive shaft that extends in the left-right direction is provided inside the arm portion 4. The drive shaft is rotatingly driven by the sewing machine motor 33. The drive shaft transmits the drive power of the sewing machine motor 33 to the needle bar up-down drive mechanism 55 (refer to FIG. 2) provided in the head portion 5. Various switches including a start/stop switch 43 are provided on the lower left portion of the front surface of the arm portion 4. The start/stop switch 43 starts or stops the operation of the sewing machine 1. Specifically, the start/stop switch 43 is used to input a sewing start command or a sewing stop command.

As shown in FIG. 2, the needle bar 51, a presser bar 53, the needle bar up-down drive mechanism 55, an image sensor 57, a projector 58, the swinging mechanism (not shown in the drawings), and the like are provided in the head portion 5. The sewing needle 52 can be mounted on the lower end of the needle bar 51. A presser foot 54 is removably attached to the lower end portion of the presser bar 53. The needle bar 51 is provided on the lower end of the needle bar up-down drive mechanism 55. The needle bar up-down drive mechanism 55 drives the needle bar 51 in the up-down direction by the rotation of the drive shaft. The swinging mechanism causes the needle bar 51 to swing in the left-right direction. The swinging mechanism is driven by a swinging motor 56 (refer to FIG. 3). During sewing, the needle bar 51 swings between a left needle drop position and a right needle drop position. The left needle drop position is a position at the left end portion of the needle hole (not shown in the drawings). The right needle drop position is a position at the right end portion of the needle hole.

The image sensor 57 is a known area sensor. The image sensor 57 is an imaging element in which a plurality of imaging elements aligned in a main scanning direction are arrayed in a plurality of rows in a sub-scanning direction. For example, a known complementary metal oxide semiconductor (CMOS) is used. In the present embodiment, the main scanning direction and the sub-scanning direction correspond to the X axis direction (the left-right direction) and the Y axis direction (the front-rear direction) of the sewing machine 1, respectively. The image sensor 57 captures an image of a predetermined range (an image capture range) on the bed portion 2.

The projector 58 projects an image onto a predetermined range (a projection range) of the bed portion 2. The projector 58 is provided with a liquid crystal panel 58A (refer to FIG. 3), a light source 58B (refer to FIG. 3), and an image forming lens (not shown in the drawings), inside a housing. The housing has a cylindrical shape. The housing is fixed to a machine casing inside the head portion 5. An LED is used as the light source 58B. The liquid crystal panel 58A modulates the light from the light source 58B. The liquid crystal panel 58A forms image light of the image projected onto the projection range, on the basis of image data representing the projection image. The image forming lens uses the image light formed by the liquid crystal panel 58A to form the image in the projection range. A detailed explanation is omitted here, but since the projector 58 projects the projection image, from diagonally above, onto the work cloth on the bed portion 2, it is assumed that processing to correct image distortion in the projection image is carried out. Note that the projection range of the projector 58 is adjusted so as to be substantially the same as the image capture range of the image sensor 57. The size of the projection range (a number of vertical dots×horizontal dots, for example) is stored in advance in a flash memory 84.

An electrical configuration of the sewing machine 1 will be explained with reference to FIG. 3. The control portion 80 is provided with a CPU 81, a ROM 82, a RAM 83, the flash memory 84, and an input/output interface (I/F) 85. The CPU 81 is connected to the ROM 82, the RAM 83, the flash memory 84, and the input/output I/F 85 via a bus 86.

The CPU 81 performs overall control of the sewing machine 1. The CPU 81 performs various arithmetic calculations and processing relating to sewing, image capture, and image projection, in accordance with various programs stored in the ROM 82. Although not shown in the drawings, the ROM 82 is provided with a plurality of storage areas, including a program storage area. The various programs to operate the sewing machine 1 are stored in the program storage area. For example, a program for pattern projection processing to be described later is stored in the program storage area. A storage area storing calculation results and the like resulting from the arithmetic processing by the CPU 81 is provided in the RAM 83. Pattern data for the sewing machine 1 to sew the pattern is stored in the flash memory 84. The pattern data includes coordinate data of needle drop positions of the practical pattern or the embroidery pattern. In the case of the embroidery pattern, the pattern data includes thread color data specifying a thread color. Further, various parameters used by the sewing machine 1 to perform the various processing are stored in the flash memory 84.

Drive circuits 91 to 97, the touch panel 32, the start/stop switch 43, the image sensor 57, and the light source 58B of the projector 58 are connected to the input/output I/F 85. The drive circuit 91 is connected to the sewing machine motor 33. The drive circuit 91 drives the sewing machine motor 33 in accordance with a control signal from the CPU 81. In accordance with the driving of the sewing machine motor 33, the needle bar up-down drive mechanism 55 is driven via the drive shaft of the sewing machine 1 and moves the needle bar 51 up and down. The drive circuit 92 is connected to the feed motor 22. The drive circuit 92 drives the feed motor 22 in accordance with a control signal from the CPU 81. When sewing the practical pattern, the feed dog is driven in accordance with the driving of the feed motor 22, and feeds the work cloth on the bed portion 2. The drive circuit 93 is connected to the swinging motor 56. The drive circuit 93 drives the swinging motor 56 in accordance with a control signal from the CPU 81. When sewing the practical pattern, the swinging mechanism is driven in accordance with the driving of the swinging motor 56. In this way, the needle bar 51 swings in the left-right direction.

The drive circuit 94 is connected to the X axis motor 63. The drive circuit 94 drives the X axis motor 63 in accordance with a control signal from the CPU 81. The drive circuit 95 is connected to the Y axis motor 64. The drive circuit 95 drives the Y axis motor 64 in accordance with a control signal from the CPU 81. When sewing the embroidery pattern, in accordance with the driving of the X axis motor 63 and the Y axis motor 64, the embroidery frame 70 mounted on the movement mechanism 60 is moved in the left-right direction (the X axis direction) and the front-rear direction (the Y axis direction) by a movement amount corresponding to the control signal.

The drive circuit 96 drives the LCD 31 in accordance with a control signal from the CPU 81. The drive circuit 96 causes an image, an operation screen and the like to be displayed on the LCD 31. The touch panel 32 outputs, to the CPU 81, coordinate data indicating an input position of an operation using the finger, the dedicated touch pen, or the like. On the basis of the coordinate data acquired from the touch panel 32, the CPU 81 recognizes the item selected on the operation screen displayed on the LCD 31. The CPU 81 performs processing corresponding to the recognized item. The start/stop switch 43 receives, separately from the touch panel 32, an input of an operation with respect to the sewing machine 1. When the start/stop switch 43 receives the input of the operation, the start/stop switch 43 outputs a signal to the CPU 81. When the CPU 81 receives the signal, the CPU 81 outputs a control signal to start or to stop the sewing operation.

The image sensor 57 outputs, to the CPU 81, data of the captured image captured by the imaging elements. The drive circuit 97 drives the liquid crystal panel 58A of the projector 58 in accordance with a control signal from the CPU 81, and causes the projection image to be displayed on the liquid crystal panel 58A. The light source 58B illuminates in accordance with a control signal from the CPU 81. The light source 58B projects the projection image displayed on the liquid crystal panel 58A onto the work cloth that is being conveyed on the bed portion 2.

The CPU 81 of the sewing machine 1 of the present embodiment performs the pattern projection processing, and projects the sewing pattern to be sewn (the practical pattern or the embroidery pattern) onto the work cloth. Hereinafter, the pattern projection processing will be explained with reference to FIG. 4 to FIG. 7.

When the user switches on a power source of the sewing machine 1, the CPU 81 causes a home screen (not shown in the drawings) to be displayed on the LCD 31. The CPU 81 receives, on the home screen, an input of an operation to select a practical sewing mode to sew the practical pattern (including the decorative pattern), or an embroidery mode to sew the embroidery pattern. When the CPU 81 receives the input of the operation to select the practical sewing mode, the CPU 81 displays a screen prompting the user to perform an operation to arrange the work cloth on the bed portion 2, and performs the pattern projection processing.

The program for the pattern projection processing is read out from the ROM 82 by the CPU 81 and is deployed in the RAM 83. The program for the pattern projection processing is executed in parallel with other programs that are being executed by the CPU 81. When the CPU 81 performs the pattern projection processing, storage areas for various data, including variables, flags, counters and the like, are secured in the RAM 83.

Figure 4:
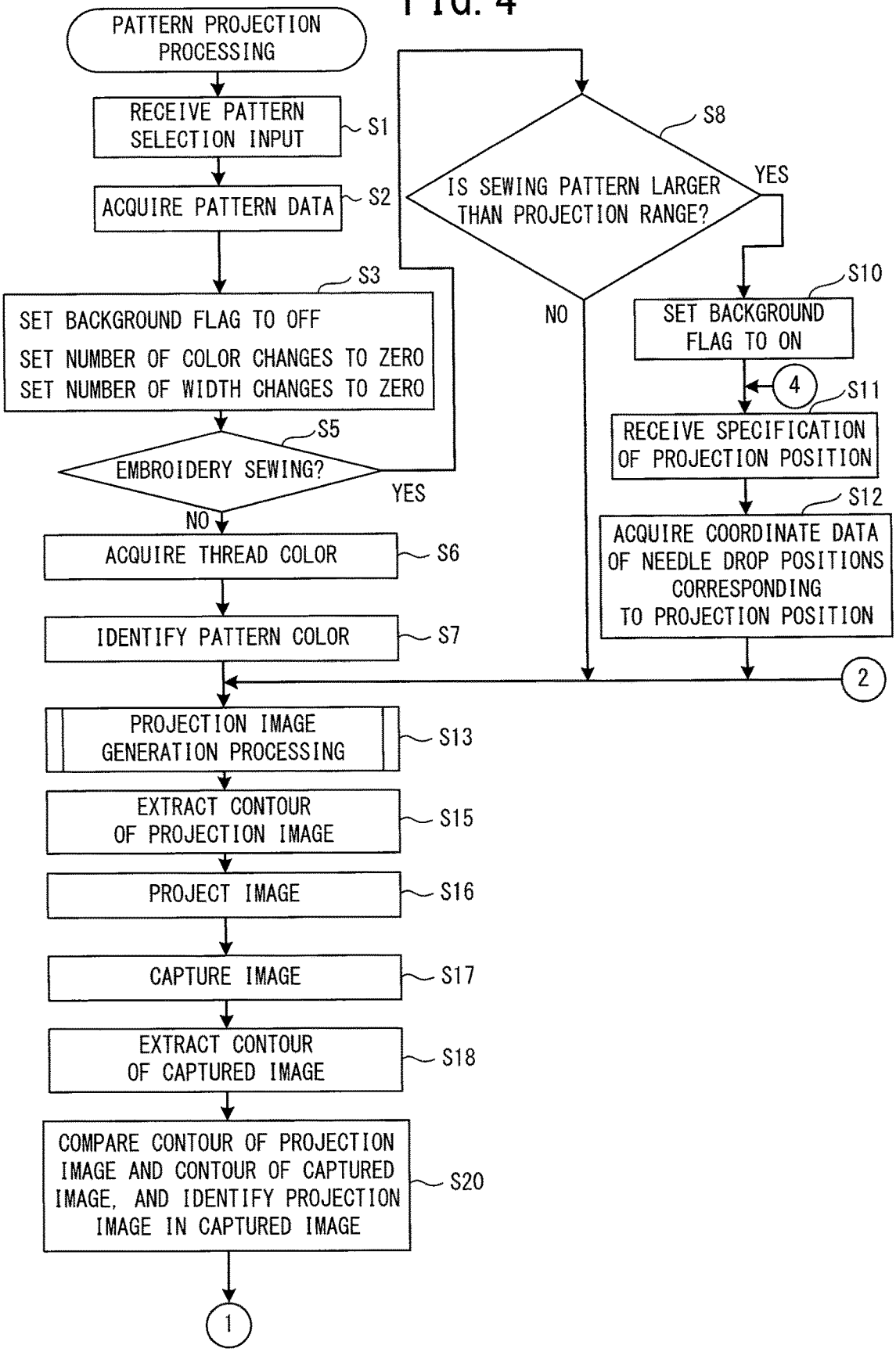
FIG. 4 is a flowchart (1/3) of pattern projection processing.

As shown in FIG. 4, the CPU 81 causes a pattern selection screen to be displayed on the LCD 31. The CPU 81 receives an input to select a pattern (step S1). A plurality of practical data and embroidery data are stored in advance in the flash memory 84. The practical data is pattern data formed by coordinate data of needle drop positions to sew stitches of one unit configuring the practical pattern. The practical data includes thumbnail images representing stitches of a plurality of units, in order to display a whole image of the practical pattern on the LCD 31. The embroidery data is pattern data formed by thread color data and coordinate data of needle drop positions separated by each thread color, in order to sew the embroidery pattern. The embroidery data includes thumbnail images in order to display a whole image of the embroidery pattern on the LCD 31.

A flow of processing in the case of the embroidery mode will be described later. When the user selects the practical sewing mode, the CPU 81 reads out, from the flash memory 84, the thumbnail images of the practical data and causes the thumbnail images to be displayed on the LCD 31. The CPU 81 receives an operation to change the thumbnail images displayed on the LCD 31, and an operation to determine the pattern to be sewn by selection of the thumbnail image.

When the pattern is selected in accordance with the operation by the user, the CPU 81 acquires the pattern data (the practical data) corresponding to the selected thumbnail image from the flash memory 84 (step S2). The CPU 81 sets a background flag to OFF, and sets a number of color changes and a number of width changes to zero (step S3). The background flag is a flag for determining whether or not to project, onto the work cloth, the projection image for which the background of the embroidery pattern is made white. When, in the embroidery mode, the whole of the embroidery pattern does not fit within the projection range of the projector 58, the CPU 81 sets the background flag to ON. In this case, the projection image for which the background of the embroidery pattern is made white is projected. The number of color changes and the number of width changes are counters used to count a number of times that changes are made. The number of color changes and the number of width changes are used to limit the number of times that a border color and a border width are changed, when creating the projection image with the practical pattern or the embroidery pattern bordered.

In the case of the practical sewing mode (no at step S5), the CPU 81 acquires a thread color (step S6). The CPU 81 displays, on the LCD 31, a screen to select or input the thread color. The CPU 81 acquires the thread color in accordance with the input by the user using the touch panel 32. If there is not input by the user, the CPU 81 acquires, from the ROM 82, a thread color that is set as a default (red, for example). The CPU 81 specifies the acquired thread color as a pattern color set for a pattern image D (refer to FIG. 8) (step S7). The pattern image D is an image representing the whole image of the pattern after sewing.

Figure 7:
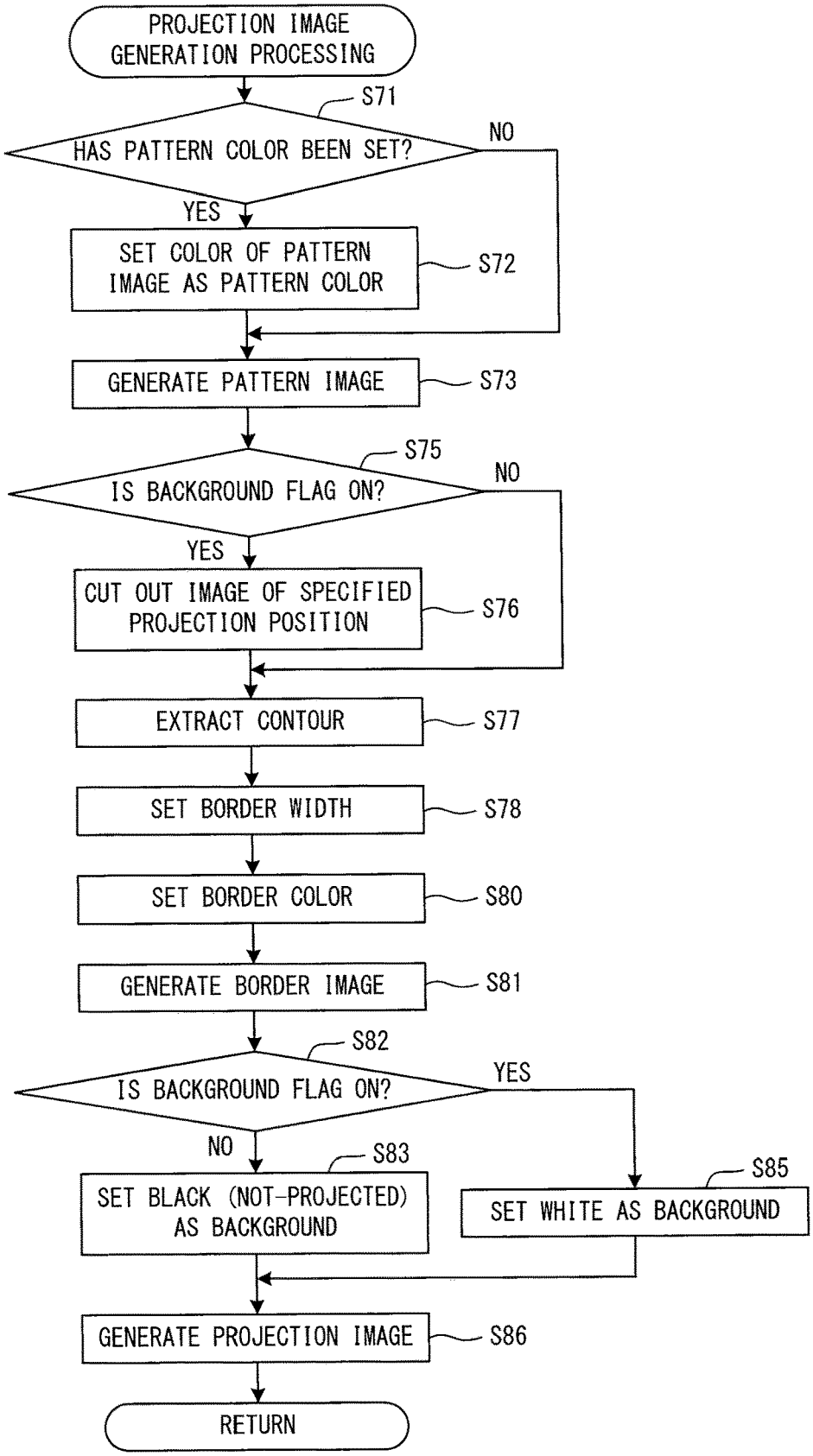
FIG. 7 is a flowchart of projection image generation processing.

The CPU 81 performs projection image generation processing (step S13). As shown in FIG. 7, in the projection image generation processing, when the pattern color is set (yes at step S71), the CPU 81 sets the color of the pattern image D as the pattern color (step S72). In other words, the color of the practical pattern is set as the pattern color. The processing advances to step S73.

Figure 8:
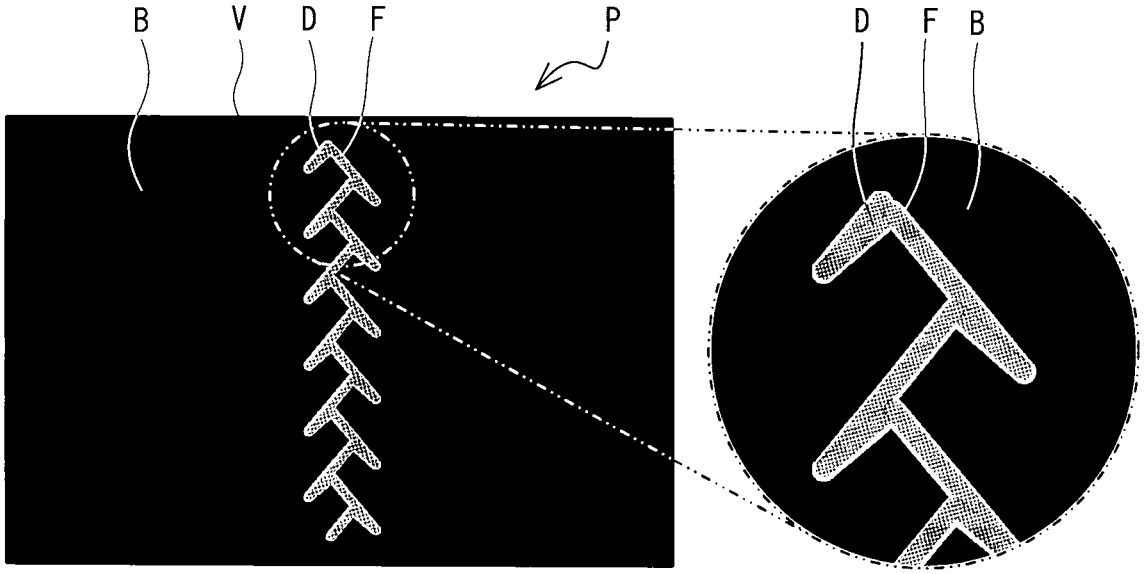
FIG. 8 is a diagram showing a projection image.

The CPU 81 generates the pattern image D (step S73). The CPU 81 secures, in the RAM 83, a virtual display region V (refer to FIG. 8) of a size corresponding to the projection range. Note that an image generated in the virtual display region V is a raster image. The CPU 81 reads the needle drop positions in accordance with the practical data acquired at step S2, and joins the needle drop positions using lines of the pattern color. In this way, the CPU 81 depicts the pattern image D of the practical pattern in the virtual display region V. As shown in FIG. 8, in the case of the practical pattern, the pattern image D is generated. A plurality of units determined in advance (6 units, for example), of a unit pattern of a predetermined shape formed by a plurality of stitches, are connected in the pattern image D.

As shown in FIG. 7, the CPU 81 determines whether or not the background flag is ON (step S75). The background flag is sometimes ON in the embroidery mode. In the practical sewing mode, the background flag is OFF (no at step S75), and thus the CPU 81 advances the processing to step S77.

The CPU 81 performs known contour extraction processing on the pattern image D, and extracts a contour line of the pattern image D (step S77). An example of the known contour extraction processing is processing applying a Laplacian filter or the like. The CPU 81 sets a border width and a border color (step S78, step S80). The CPU 81 depicts a border image F (refer to FIG. 8) in the virtual display region V (step S81). The border width is a width of the border image F surrounding and bordering the periphery of the pattern image D. The border color is a color in which the border image F is colored. The border widths and the border colors set by the CPU 81 include a default width and a default color that are set in advance. The default value of the border width is 1 dot, for example. The default color of the border color is white, for example. Note that the border width and the border color can be changed in processing at step S43 and step S47 to be described later. When the border width and the border color are changed in the processing at step S43 and step S47, at step S78 and step S80, the border width and the border color changed in the processing at step S43 and step S47 are set as the border width and the border color of the border image F. The border image F is, for example, generated by an outer shape line created by offsetting a contour line toward the outside by an amount of the border width, and by coloring in, using the border color, a region of a space between the outer shape line and the contour line. Specifically, the border image F is generated so as to be adjacent to the contour line representing the outer edge of the pattern image D. As shown in FIG. 8, the pattern image D and the border image F are generated in the virtual display region V. The border image F is an image bordering the pattern image D by the border width, and is colored using the border color.

As shown in FIG. 7, the CPU 81 determines whether the background flag is ON (step S82). In the practical sewing mode, the background flag is OFF (no at step S82), and thus, the CPU 81 sets black as the background color of the pattern image D (step S83), and advances the processing to step S86. Note that, of a projection image P (refer to FIG. 8) displayed on the liquid crystal panel 58A, the projector 58 does not form an image of sections that are black. Thus, when the background color is black, the pattern image D and the border image F are projected in the projection range on the bed portion 2, and a background section is not projected. The CPU 81 generates the projection image P for which the background section of the virtual display region V is black (step S86). As shown in FIG. 8, the projection image P, in which the pattern image D, the border image F, and a background image B are depicted, is generated in the virtual display region V. The background image B is a background to the pattern image D and the border image F, and is black. The CPU 81 returns the processing to the pattern projection processing.

Figure 9:
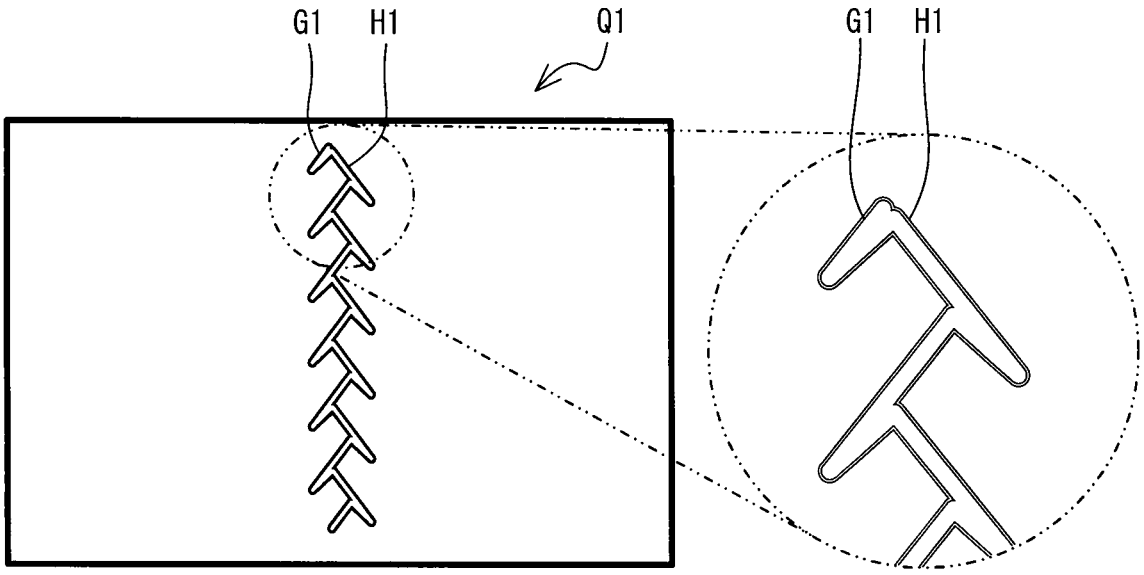
FIG. 9 is a diagram showing a contour extraction image.
Figure 10:
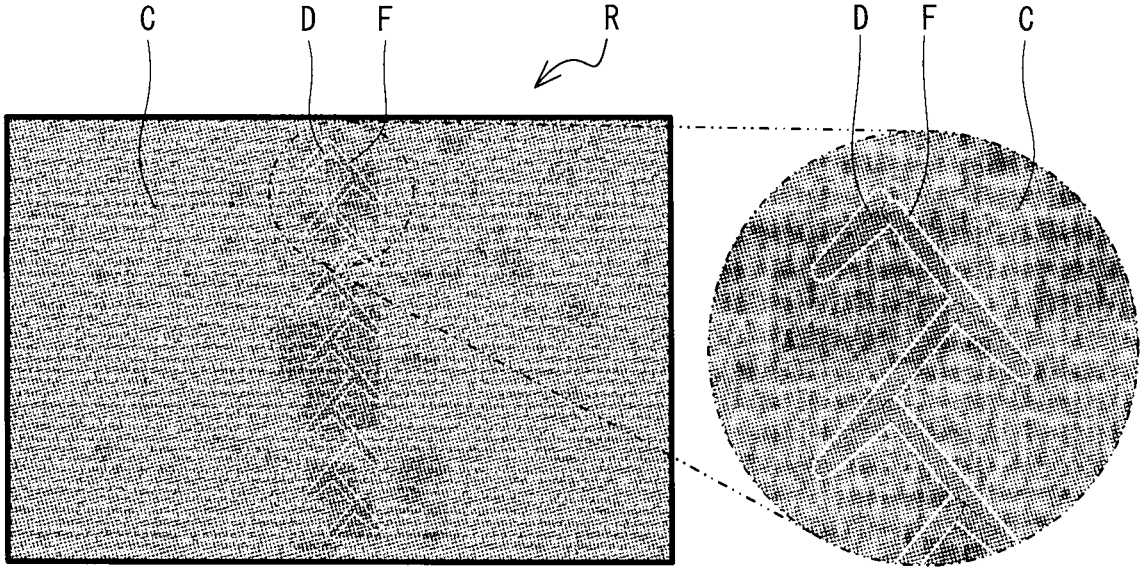
FIG. 10 is a diagram showing a captured image.

As shown in FIG. 4, the CPU 81 performs the contour extraction processing on the projection image P (step S15). As shown in FIG. 9, a contour line G1 bordering the pattern image D, and a contour line H1 bordering the border image F are extracted from the projection image P. A contour extraction image Q1 in which the contour line G1 and the contour line H1 are extracted is a raster image. The contour extraction image Q1 is stored in the RAM 83. As shown in FIG. 4, the CPU 81 drives the projector 58 and projects the projection image P onto a work cloth C (refer to FIG. 10) (step S16). The pattern image D and the border image F are formed on the work cloth C. The CPU 81 uses the image sensor 57 to capture an image of the image capture range on the work cloth C onto which the projection image P is projected (step S17). As described above, the image capture range of the image sensor 57 is substantially the same as the projection range of the projector 58. As shown in FIG. 10, the work cloth C, and the pattern image D and the border image F formed on the work cloth C are included in a captured image R obtained by capturing the image of the image capture range. Since the black background image B is not formed, the background image B is not included in the captured image R. The captured image R is a raster image and is stored in the RAM 83.

Figure 11:
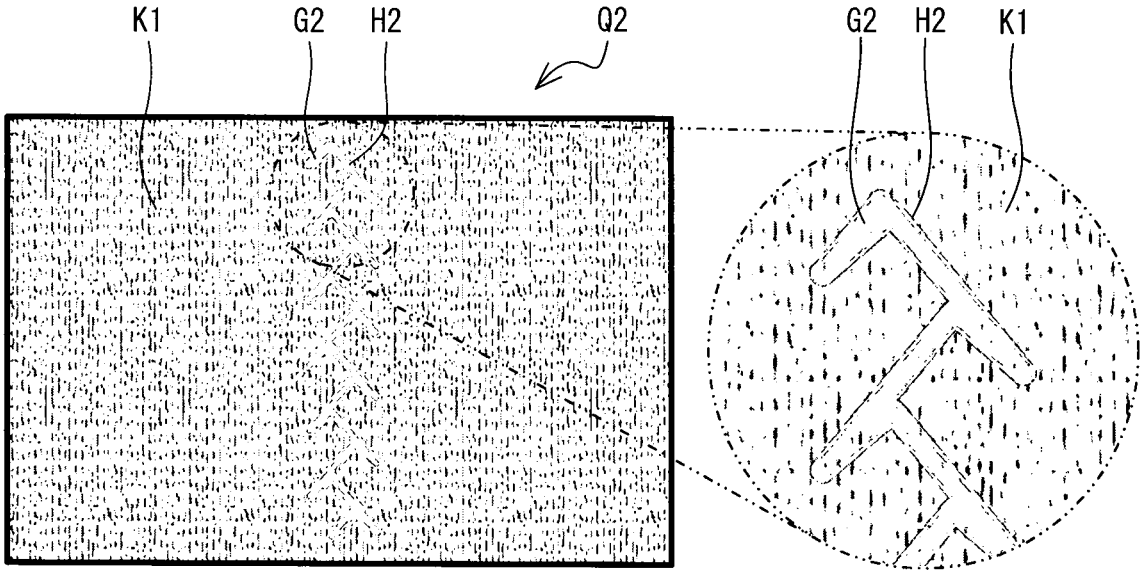
FIG. 11 is a diagram showing a contour extraction image.

As shown in FIG. 4, the CPU 81 performs the contour extraction processing on the captured image R (step S18). As shown in FIG. 11, a contour line G2 bordering the pattern image D and a contour line H2 bordering the border image F are extracted from the captured image R. A contour extraction image Q2 including the extracted contour line G2 and contour line H2 is a raster image, and is stored in the RAM 83. Further, the work cloth C is also included in the captured image R. Thus, in addition to the contour line G2 and the contour line H2, contour lines K1 are also included in the contour extraction image Q2. The contour lines K1 are lines bordering shadows of a texture or wrinkles of the work cloth C.

The CPU 81 compares the contour extraction image Q1 generated from the projection image P and the contour extraction image Q2 generated from the captured image R. Using the comparison, the CPU 81 performs processing to identify the projection image P in the captured image R (step S20). Specifically, the CPU 81 performs known template matching. In the template matching, the contour extraction image Q1 is used as the template, and sections resembling the contour line G1 and the contour line H1 of the contour extraction image Q1 (the contour line G2 and the contour line H2) are searched for in the contour extraction image Q2. Through the template matching, the CPU 81 detects the position, orientation, and size of the contour extraction image Q1 in the contour extraction image Q2, and overlaps the contour extraction image Q1 and the contour extraction image Q2. The CPU 81 calculates a rate of concordance between the sections in the contour extraction image Q2 corresponding to the contour line G1 and the contour line H1 (the contour line G2 and the contour line H2), and the contour line G1 and the contour line H1. The rate of concordance is calculated by comparing the contour line G1 and the contour line H1 with the contour extraction image Q2 in pixel units, and determining that mutually corresponding pixels are matched when they are within a predetermined similarity range. When the rate of concordance of all the pixels is equal to or greater than a predetermined percentage (75%, for example), the CPU 81 determines that the projection image P has been identified in the captured image R.

For example, when the border color of the border image F and a color of the work cloth C are similar, there is a case in which a boundary between the border image F and the work cloth C in the captured image R cannot be clearly identified. In this case, the contour line H2 of the border image F extracted from the captured image R is significantly different to the contour line H1 extracted from the projection image P, and thus, the rate of concordance is low. Further, for example, when the border width of the border image F is small and the pattern color of the pattern image D and the color of the work cloth C are similar, sometimes the border image F cannot be identified from the captured image R, and the boundary between the pattern image D and the work cloth C cannot be clearly identified. In this case also, the contour line G2 and the contour line H2 that are extracted are different from the contour line G1 and the contour line H1 and thus, the rate of concordance is low. When the rate of concordance is low, namely, when the projection image P cannot be identified on the work cloth C onto which the projection image P is projected, the contour of the border image F or the pattern image D is not clear. Thus, the user cannot easily see the pattern image D on the work cloth C.

Figure 5:
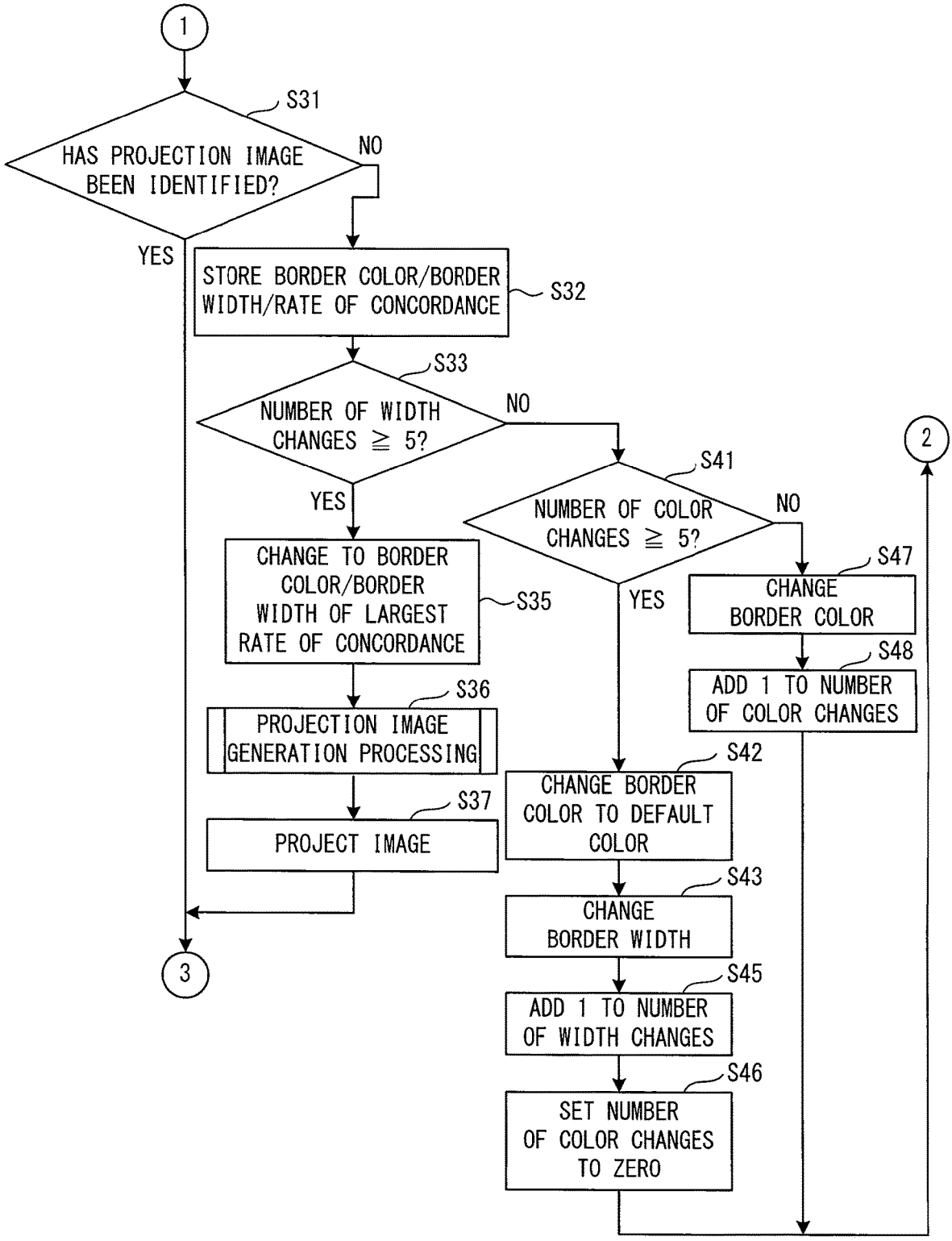
FIG. 5 is a flowchart (2/3) of the pattern projection processing.
Figure 6:
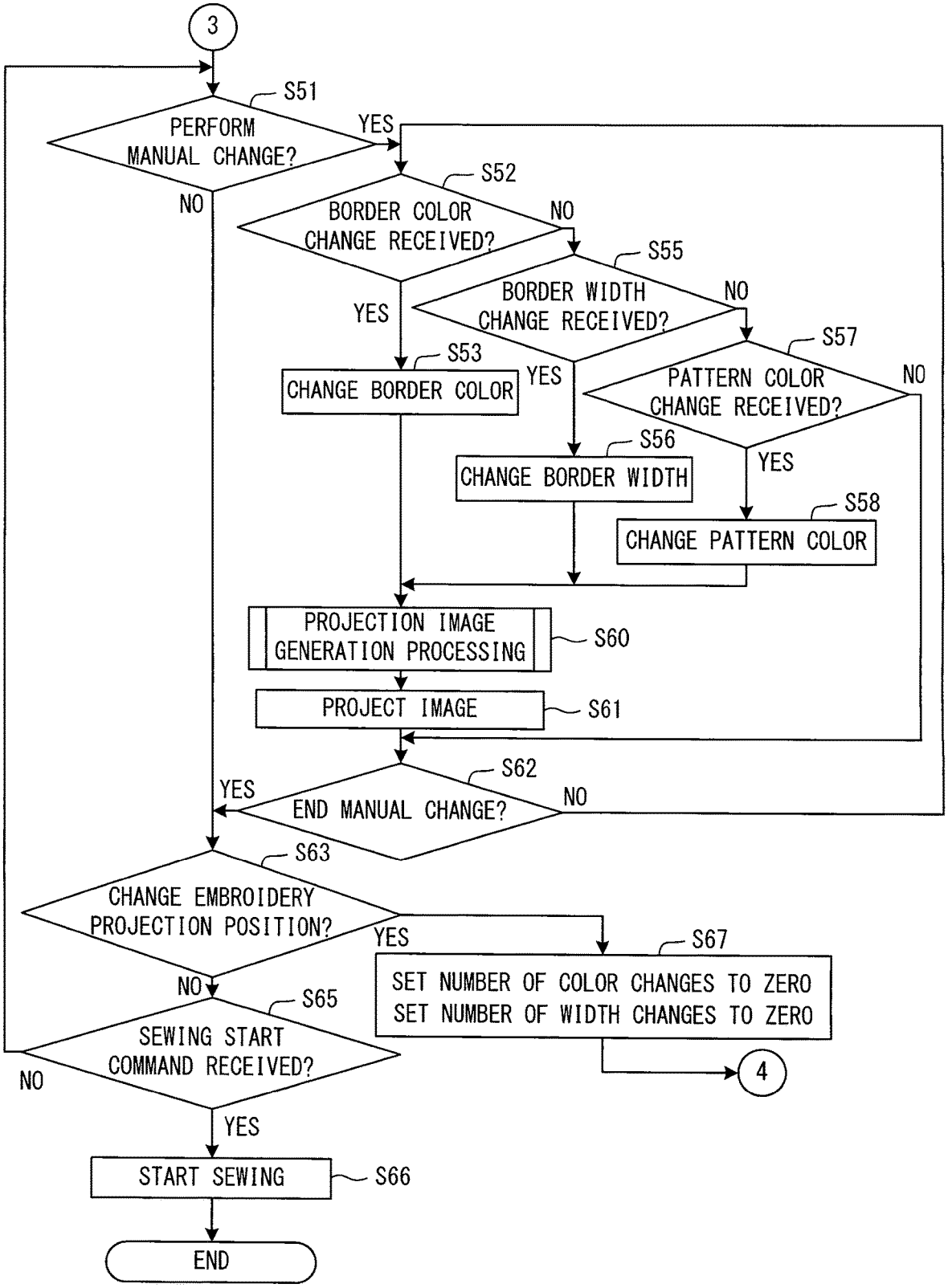
FIG. 6 is a flowchart (3/3) of the pattern projection processing.

As shown in FIG. 5, when the projection image P is identified (yes at step S31), the CPU 81 advances the processing to step S51 (refer to FIG. 6). When the projection image P cannot be identified (no at step S31), the CPU 81 stores, in the RAM 83, the currently set border color and border width and the rate of concordance calculated at step S22 (step S32). When the number of width changes is less than five (no at step S33), and the number of color changes is less than five (no at step S41), the CPU 81 changes the border color (step S47). The CPU 81 distinguishes the color of the work cloth C from the captured image R captured by the image sensor 57. As the new border color, the CPU 81 changes from the current border color to a complementary color of the distinguished color or to a color that is similar to the complementary color. The changed border color is set in the border image F at step S80 (refer to FIG. 7). The CPU 81 adds 1 to the number of color changes (step S48) and returns the processing to step S13.

When the processing at step S13 to step S20 is performed and the projection image P cannot be identified (no at step S31), the CPU 81 stores the currently set border color and border width, and the rate of concordance determined at step S22 (step S32). Until the number of color changes reaches five (no at step S33; no at step S41), the CPU 81 sets a not yet selected color as the new border color, from among the complementary colors to the color of the work cloth C, or the colors similar to the complementary colors (step S47). The CPU 81 repeatedly performs the processing from step S13 to step S20 and tries to identify the projection image P. When the projection image P can still not be identified (no at step S31) and the number of color changes is equal to or more than five (yes at step S41), the CPU 81 changes the border color to be set for the border image F to the default color (step S42). At step S78 (refer to FIG. 7), the CPU 81 changes the border width to be set for the border image F to a width that is one dot larger (step S43). The CPU 81 adds 1 to the number of width changes (step S45). The CPU 81 sets the number of color changes to zero (step S46), and returns the processing to step S13.

Figure 12:
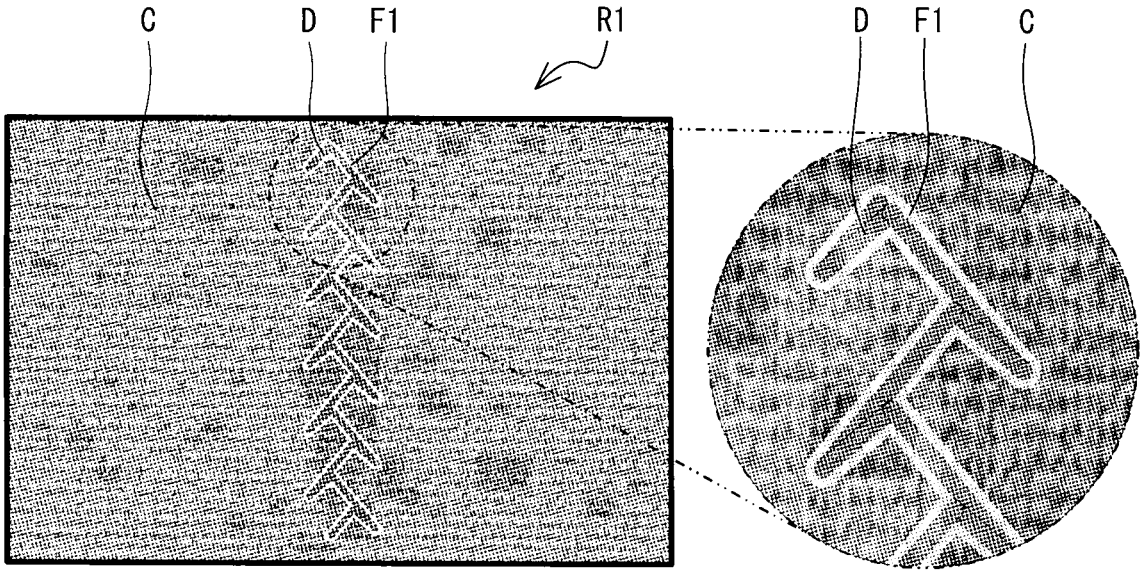
FIG. 12 is a diagram showing a captured image.
Figure 13:
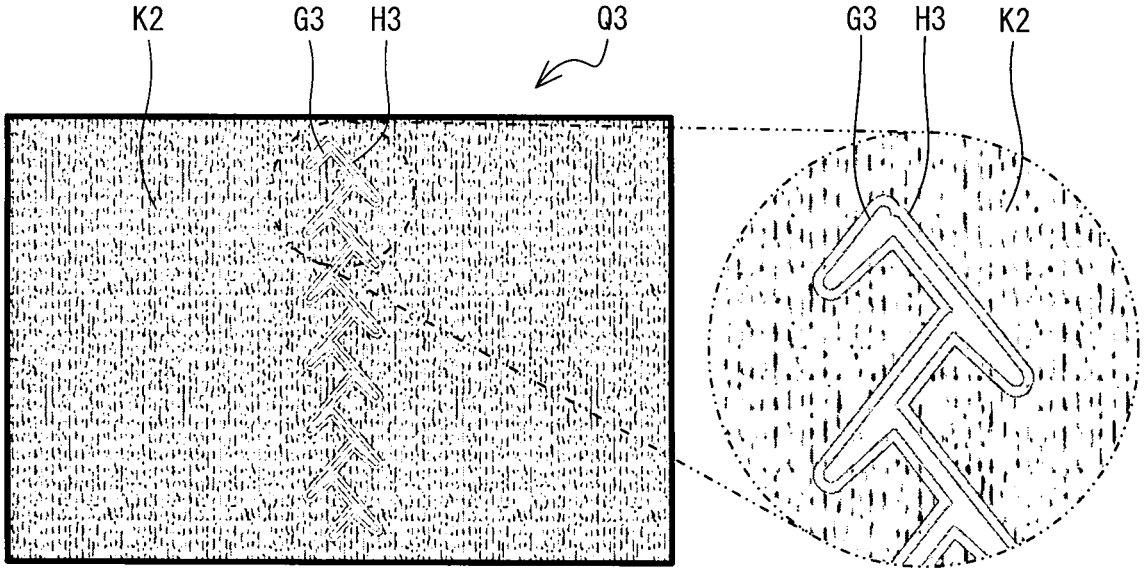
FIG. 13 is a diagram showing a contour extraction image.

With respect to the border image F whose width has become larger, similarly to the above description, the CPU 81 tries to identify the projection image P through the processing from step S13 to step S20. As shown in FIG. 12, the work cloth C, the pattern image D formed on the work cloth C, and a border image F1 whose width has become larger are included in a captured image R1 obtained by capturing the image of the image capture range. The black background image B is not formed and thus is not included in the captured image R1. As shown in FIG. 13, a contour extraction image Q3 is generated by extracting a contour line G3 bordering the pattern image D and a contour line H3 bordering the border image F1 from the captured image R1. Further, contour lines K2 bordering shadows of the texture and wrinkles of the work cloth C are also included in the contour extraction image Q3.

As shown in FIG. 5, when the projection image P cannot be identified (no at step S31), until the number of color changes becomes five (no at step S33; no at step S41), the CPU 81 sets the not yet selected color as the new border color, from among the complementary colors to the color of the work cloth C, or the colors similar to the complementary colors (step S47), and tries to identify the projection image P by the processing from step S13 to step S20. When the projection image P can still not be identified (no at step S31) and the number of color changes has become five (yes at step S41), the CPU 81 further changes the border width to a width that is one dot larger (step S43), adds 1 to the number of width changes (step S45), and similarly to the above description, tries to identify the projection image P.

When the projection image P can still not be identified (no at step S31) and the number of width changes is equal to or more than five (yes at step S33), the CPU 81 changes the border color and the border width of the border image F to the border color and the border width corresponding to the largest rate of concordance, among the rates of concordance stored in the RAM 83 (step S35). The CPU 81 performs the projection image generation processing (step S36). The CPU 81 generates the projection image P in which the pattern image D, the border image F for which the border color and border width changed at step S35 have been set, and the background image B are depicted. The CPU 81 drives the projector 58 and projects the projection image P onto the work cloth C (step S37). The CPU 81 advances the processing to step S51.

As shown in FIG. 6, the CPU 81 displays, on the LCD 31, a screen that receives execution commands relating to a plurality of types of processing, and stands by for the processing (no at step S51; no at step S63; no at step S65; step S51). A first execution command is a command for the user to manually change the border color and the border width of the border image F, and the pattern color of the pattern image D (step S51). More specifically, this is a command to change the border color, the border width, and the pattern color on the basis of the user operation, to a state desired by the user. A second execution command is a command to change a projection position of the embroidery pattern in the embroidery mode (step S63). A third execution command is a command to start the sewing of the sewing pattern (the practical pattern) on the basis of the pattern data (the practical data) of a projection target (step S65). The command to start the sewing of the sewing pattern is performed by operating the start/stop switch 43.

When the user has issued the command to manually change the border color and the border width of the border image F and the pattern color of the pattern image D (yes at step S51), the CPU 81 displays a screen that receives the command to change the border color, the border width, and the pattern color, and an end command to end the manual change processing, and stands by for the processing (no at step S52; no at step S55; no at step S57; no at step S62; step S52).

When the command to change the border color is received (yes at step S52), the CPU 81 displays colors to be candidates for the border color on the LCD 31, using a color circle chart for example, and receives a selection. The CPU 81 sets the color selected by the user using the touch panel 32 as the border color to be set for the border image F (step S53), and advances the processing to step S60. The CPU 81 performs the projection image generation processing (refer to FIG. 7). In the projection image generation processing, the pattern image D, the border image F, and the projection image P are generated (step S60). The border image F is colored using the border color selected by the user. The background image B is depicted in the projection image P. The CPU 81 drives the projector 58 and projects the projection image P onto the work cloth C (step S61). The CPU 81 advances the processing to step S62 and returns to the stand-by state.

When the command to change the border width is received (yes at step S55), the CPU 81 displays a screen to set the border width on the LCD 31, and receives an input. The CPU 81 sets the width selected by the user using the touch panel 32 as the border width to be set for the border image F (step S56), and advances the processing to step S60. The CPU 81 performs the projection image generation processing. In the projection image generation processing, the pattern image D, the border image F, and the projection image P are generated (step S60). The border width set by the user is applied to the border image F. The background image B is depicted in the projection image P. The CPU 81 drives the projector 58 and projects the projection image P onto the work cloth C (step S61). The CPU 81 advances the processing to step S62 and returns to the stand-by state.

When the command to change the pattern color is received (yes at step S57), the CPU 81 displays the colors to be the candidates for the pattern color on the LCD 31, using the color circle chart for example, and receives a selection. The CPU 81 sets the color selected by the user using the touch panel 32 as the pattern color to be set for the pattern image D (step S58), and advances the processing to step S60. The CPU 81 performs the projection image generation processing. In the projection image generation processing, the pattern image D, the border image F, and the projection image P are generated (step S60). The pattern image D is colored using the pattern color set by the user. The background image B is depicted in the projection image P. The CPU 81 drives the projector 58 and projects the projection image P onto the work cloth C (step S61). The CPU 81 advances the processing to step S62 and returns to the stand-by state.

When the command to end the manual change processing is received (yes at step S62), the CPU 81 advances the processing to step S63. The CPU 81 displays, on the LCD 31, the screen that receives the execution commands of the plurality of types of processing, and stands by for the processing (no at step S51; no at step S63; no at step S65; step S51). A command to change a projection position of the embroidery pattern in the embroidery mode (step S63) will be described later. When the user operates the start/stop switch 43 (yes at step S65), the CPU 81 starts the sewing of the practical pattern (step S66), and ends the pattern projection processing. Note that the CPU 81 executes programs to control the driving of the sewing machine 1, and drives the sewing machine motor 33, the feed motor 22, and the swinging motor 56 in accordance with the practical data. In this way, the CPU 81 causes the practical pattern to be sewn while conveying the work cloth C. When the user once more operates the start/stop switch 43, the CPU 81 ends the sewing of the practical pattern.

Next, a flow of processing in the embroidery mode will be explained. As shown in FIG. 4, when the user selects the embroidery mode on the home screen, the CPU 81 displays a screen prompting the user to perform an operation to mount the embroidery frame 70 holding the work cloth C on the carriage 62 of the movement mechanism 60. The CPU 81 performs the pattern projection processing. Similarly to the practical sewing mode, the CPU 81 reads out, from the flash memory 84, thumbnail images of the embroidery data, and displays the thumbnail images on the LCD 31, and receives a selection (step S1). When a pattern is selected in accordance with an operation by the user, the CPU 81 acquires, from the flash memory 84, the embroidery data corresponding to the selected thumbnail image (step S2). The CPU 81 sets the background flag to OFF, and sets the number of color changes and the number of width changes to zero (step S3).

In the case of the embroidery mode (yes at step S5), the CPU 81 advances the processing to step S8. The CPU 81 determines whether the size of the embroidery pattern is larger than the projection range of the projector 58 (step S8). Information about the size of the embroidery pattern is included in the embroidery data. The CPU 81 may read out coordinates of needle drop positions from the embroidery data. The CPU 81 may determine the size of the embroidery pattern on the basis of a maximum value and a minimum value of the read out coordinates. When the size of the embroidery pattern is equal to or less than the size of the projection range (no at step S8), the CPU 81 advances the processing to the projection image generation processing at step S13.

Figure 14:
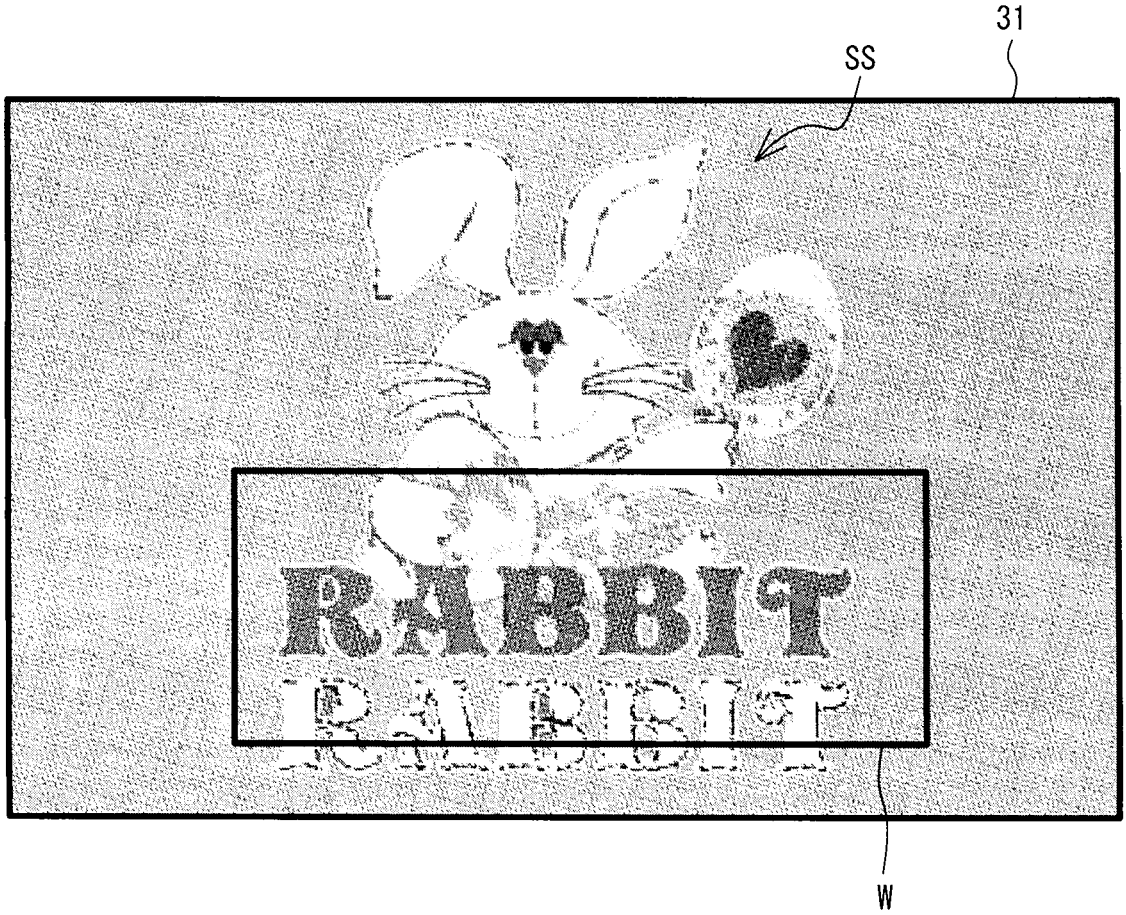
FIG. 14 is a diagram showing a thumbnail image of an embroidery pattern on the LCD.

When the size of the embroidery pattern is larger than the size of the projection range (yes at step S8), the CPU 81 sets the background flag to ON (step S10). As shown in FIG. 14, the CPU 81 displays a thumbnail image SS of the embroidery data on the LCD 31. The CPU 81 further displays a frame line W, which corresponds to the projection range, so as to be overlapped with the thumbnail image SS. The position of the frame line W can be moved by the user performing a panel operation. As shown in FIG. 4, using the position of the frame line W, the CPU 81 receives a command specifying a section (a partial pattern) of the embroidery pattern that is projected onto the work cloth C (step S11). When the user moves the frame line W and specifies the projection position of the embroidery pattern, the CPU 81 acquires, from the embroidery data, the coordinate data of the needle drop positions corresponding to the projection position after the move (step S12). The CPU 81 advances the processing to the projection image generation processing at step S13.

As shown in FIG. 7, in the projection image generation processing in the embroidery mode, the CPU 81 determines whether the pattern color is set (step S71). In the embroidery mode, the pattern color is sometimes set by a command by the user, by the processing from step S52 to step S62. When the pattern color is not set (no at step S71), thread color data included in the embroidery data is applied to the pattern image D. In this case, the color tone of the pattern image D projected onto the work cloth C is the color tone based on the original embroidery data. Thus, the user is not likely to feel a difference between the projection image P projected onto the work cloth C and the embroidery pattern sewn on the work cloth C.

Similarly to the practical pattern, the CPU 81 generates the pattern image D of the embroidery pattern on the basis of the embroidery data (step S73). When the background flag is ON (yes at step S75), the CPU 81 cuts out, from the pattern image D, a partial image DD (refer to FIG. 15), which is an image of the part corresponding to the partial pattern (step S76). The cutting out of the partial image DD is performed on the basis of the coordinate data of the needle drop positions acquired at step S12.

The CPU 81 extracts a contour line from the partial image DD and generates the border image F (step S81). When the size of the embroidery pattern is larger than the size of the projection range and the background flag is ON (yes at step S82), the CPU 81 sets the background image B of the partial image DD to white (step S85). The CPU 81 generates the projection image P in which the partial image DD, the border image F, and the background image B are depicted (step S86). Note that, when the background image B is white, a background section is the projection target. The CPU 81 returns the processing to the pattern projection processing.

Figure 15:
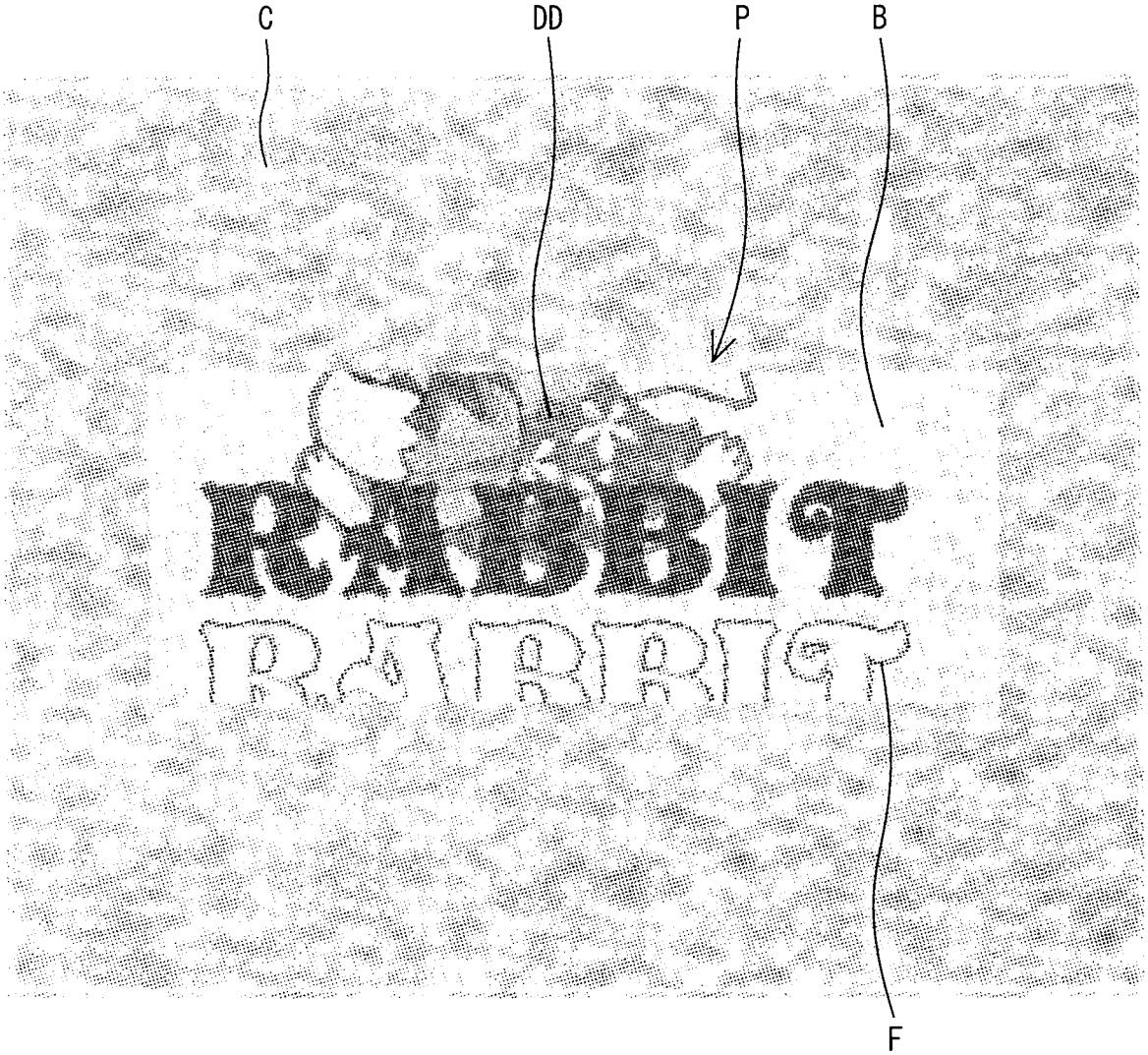
FIG. 15 is a diagram in which a projectable range of the embroidery pattern is projected onto the work cloth.

As shown in FIG. 4, the CPU 81 performs the contour extraction processing on the projection image P (step S15) and generates the contour extraction image Q1. The CPU 81 drives the projector 58 and projects the projection image P onto the work cloth C (step S16). As shown in FIG. 15, the partial image DD, the border image F, and the white background image B are formed on the work cloth C. As shown in FIG. 4, using the image sensor 57, the CPU 81 captures an image of the projection range of the work cloth C onto which the projection image P is projected (step S17). The CPU 81 performs the contour extraction processing on the captured image R (step S18) and generates the contour extraction image Q2. The CPU 81 compares the contour extraction image Q1 and the contour extraction image Q2, and identifies the projection image P in the captured image R (step S20).

As shown in FIG. 5, when the projection image P cannot be identified (no at step S31), similarly to the practical sewing mode, the CPU 81 repeats the processing from step S32 to step S48 and from step S13 to step S20. As shown in FIG. 6, after the identification of the projection image P, the CPU 81 receives the changes of the border color, the border width, and the pattern color, by performing the processing from step S51 to step S62. When, in the processing at step S63, the command to change the projection position of the embroidery pattern is received (yes at step S63), the CPU 81 sets the number of color changes and the number of width changes to zero (step S67), and returns the processing to step S11. When the user moves the frame line W and specifies the projection position of the embroidery pattern (step S11), the CPU 81 cuts out, from the pattern image D of the embroidery pattern, the partial image DD of the partial pattern corresponding to the projection position. The CPU 81 generates the projection image P on the basis of the partial image DD (step S13), and projects the projection image P onto the work cloth C (step S16).

Figure 16:
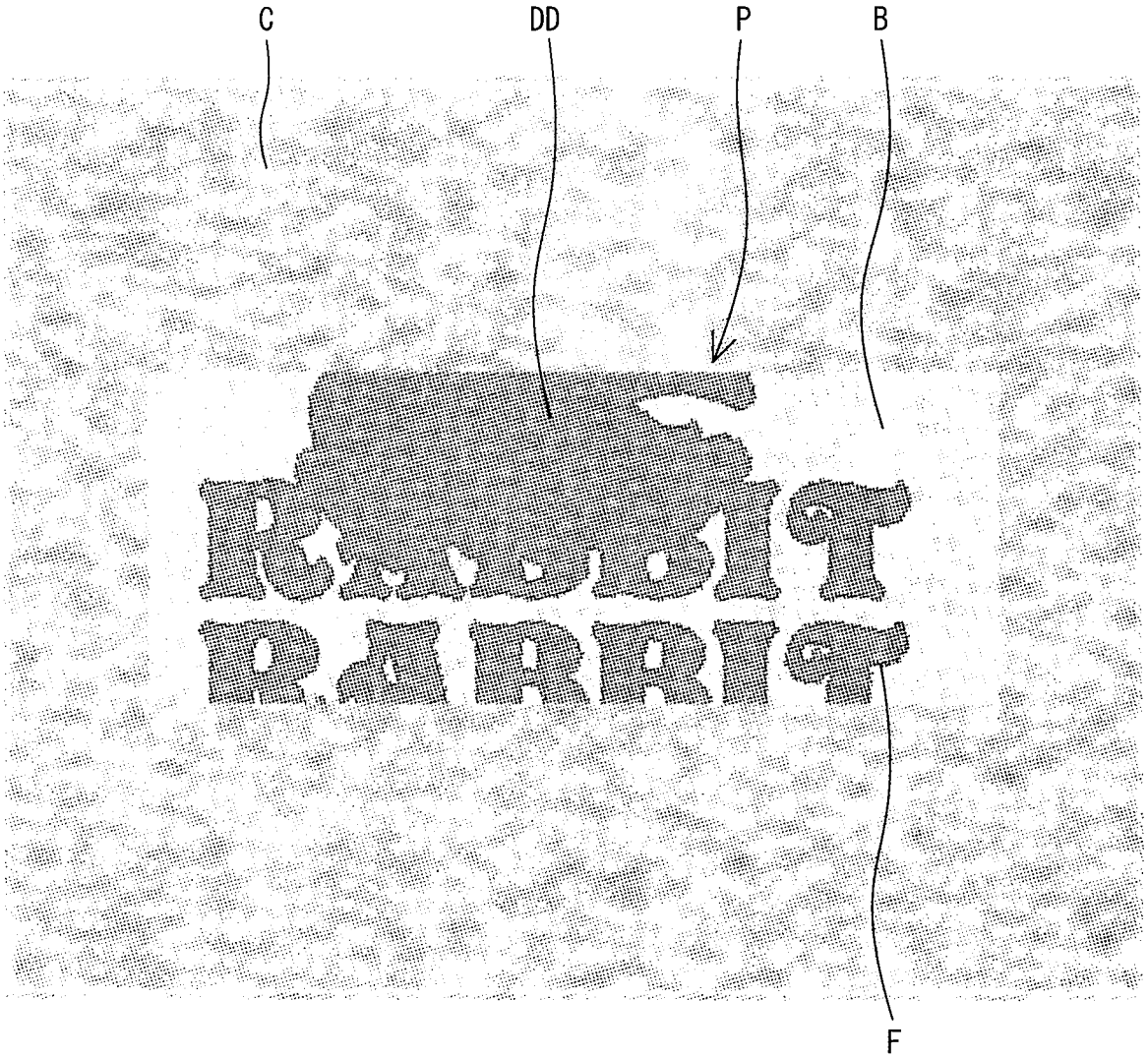
FIG. 16 is a diagram obtained by projecting the projectable range of the embroidery pattern onto the work cloth with a single color.

When, in the processing at step S57, the command to change the pattern color is received (yes at step S57), the CPU 81 sets the color selected by the user as the pattern color (step S58). The CPU 81 projects the projection image P generated in the pattern image generation processing onto the work cloth C (step S16). As shown in FIG. 16, the partial image DD (the pattern image D when the whole of the embroidery pattern is included within the projection range) is projected in the form of a silhouette that is colored using a single color.

As shown in FIG. 6, when the user operates the start/stop switch 43 (yes at step S65), the CPU 81 starts the sewing of the embroidery pattern (step S66), and ends the pattern projection processing. When the final needle drop position of the embroidery data is sewn, the CPU 81 ends the sewing of the embroidery pattern.

As described above, using the projector 58, the sewing machine 1 projects the pattern image D representing the sewing pattern to be sewn on the work cloth C onto the bed portion 2 on which the work cloth C is conveyed. The sewing machine 1 can project the border image F or the background image B along with the pattern image D. The border image F and the background image B are adjacent to the outer edge of the pattern image D, and are arranged so as to surround the pattern image D. In other words, the sewing machine 1 projects, onto the work cloth C, the projection image P in which the border image F and the background image B surround the periphery of the pattern image D. Thus, irrespective of the color tone and the material of the work cloth C, the sewing machine 1 can allow the user to easily see the pattern image D on the work cloth C.

The border image F can accentuate the pattern image D in a conspicuous state. Thus, irrespective of the color tone and the material of the work cloth C, the sewing machine 1 can allow the user to easily see the pattern image D on the work cloth C.

In the projection image generation processing, the sewing machine 1 can allow the user to easily see the border image F on the work cloth C, by changing the border color. The change of the border color may be performed by the user selecting a desired color. Alternatively, the border color may be changed when the projection image P cannot be identified in the captured image R that is captured when the projection image P is projected onto the work cloth C. Thus, the sewing machine 1 can cause the pattern image D bordered by the border image F to be accentuated in an even more conspicuous state. As a result, irrespective of the color tone and the material of the work cloth C, the sewing machine 1 can allow the user to easily see the pattern image D on the work cloth C.

In the projection image generation processing, the sewing machine 1 can allow the user to easily see the border image F on the work cloth C, by changing the border width. The change of the border width may be performed by the user selecting a desired width. Alternatively, the border width may be changed to a wider border width when the projection image P cannot be identified in the captured image R that is captured when the projection image P is projected onto the work cloth C. Thus, the sewing machine 1 can cause the pattern image D bordered by the border image F to be accentuated in an even more conspicuous state. As a result, irrespective of the color tone and the material of the work cloth C, the sewing machine 1 can allow the user to easily see the pattern image D on the work cloth C.

When, due to the color tone and the material of the work cloth C, the projection image P becomes buried in the work cloth C, it is difficult to identify a section corresponding to the projection image P in the captured image R. In contrast to this, the sewing machine 1 compares the contour extraction images Q1 and Q2 extracted from the captured image R and the projection image P, respectively. In this way, the sewing machine 1 can determine whether it is possible to identify the section corresponding to the projection image P in the captured image R. When the projection image P cannot be identified, the sewing machine 1 can make the appropriate changes to the border color or the border width.

The practical pattern is sewn using a thread of a single color. Thus, there is a possibility that, depending on the color tone and the material of the work cloth C, the user can barely see the practical pattern. The sewing machine 1 can project the pattern image D of the practical pattern along with the border image F. Thus, irrespective of the color tone and the material of the work cloth C, the sewing machine 1 can allow the user to easily see the pattern image D of the practical pattern on the work cloth C.

The sewing machine 1 can change the pattern color. Thus, irrespective of the color tone and the material of the work cloth C, the sewing machine 1 can allow the user to easily see the pattern image D of the practical pattern on the work cloth C.

The embroidery pattern is sewn using embroidery threads of a plurality of colors. The sewing machine 1 can also form the pattern image D of the embroidery pattern using the single pattern color. By projecting the pattern image D of the single color onto the work cloth C, irrespective of the color tone and the material of the work cloth C, the sewing machine 1 can allow the user to easily see the pattern image D of the embroidery pattern on the work cloth C. As a result, the user easily ascertains the overall shape and size of the embroidery pattern.

By including the background image B in the projection image P, the sewing machine 1 can accentuate the pattern image D in an even more conspicuous state. Thus, irrespective of the color tone and the material of the work cloth C, the sewing machine 1 can allow the user to easily see the pattern image D on the work cloth C. Further, in the case of the embroidery pattern, using the background image B, the partial image DD corresponding to the section represented by the partial pattern in the sewing pattern can be clearly indicated. Thus, the user easily ascertains the whole of the sewing pattern.

Various modifications can be made to the above-described embodiment. In the processing at step S6, the CPU 81 acquires the thread color as a result of the input by the user. The method of acquiring the thread color is not limited to this example. For example, an image sensor that captures an image of the thread spool 20 may be provided in the sewing machine 1. The CPU 81 may acquire the thread color by analyzing an image captured by the image sensor.

In the processing at step S2, the CPU 81 reads out and thus acquires the pattern data from the flash memory 84. The present disclosure is not limited to this example, and the sewing machine 1 may be provided with, for example, a USB reader/writer that can be connected to an external storage device, such as a USB memory. The CPU 81 may read out and acquire the pattern data from the USB memory, via the USB reader/writer. Alternatively, the sewing machine 1 may be connected to a network in a wired or wireless manner. The CPU 81 may download and acquire the pattern data from a server provided in the network.

In the embroidery mode, in the processing at step S85, the CPU 81 sets the background image B of the projection image P to be white. For example, the CPU 81 may display, on the work cloth C, the projection range in which the background image B is a frame-shaped image bordering an outer peripheral section of the projection image P. The color of the background image B is not limited to white, and may be any color other than black.

In the processing at step S63, the command to change the projection position of the embroidery pattern is not limited to the case of operating a button or the like that receives the command, for example. For example, the frame line W may be moved by a panel operation in which the frame line W is touched and dragged. If this method is adopted, the CPU 81 can seamlessly update the projection image P projected onto the work cloth C, in line with the change of the position of the frame line W.

The upper limit of the number of color changes in the determination at step S41 is not limited to five, and can be changed as appropriate. Similarly, the upper limit of the number of width changes in the determination at step S33 is not limited to five, and can be changed as appropriate. In the processing at step S43, the CPU 81 increases the border width of the border image F by one dot each time the processing is performed. The CPU 81 may increase the border width by two dots or more. In the processing at step S20, the CPU 81 determines that the projection image P has been identified in the captured image R when the rate of concordance between the contour line G1 and the contour line H1 and the contour extraction image Q2 is equal to or greater than 75%, for example. The CPU 81 may take a desired rate of concordance as a reference. The border image F is not limited to the line of the predetermined width. For example, the border image F may be a dotted line, a chain line, or an ornamental line.

In the processing at step S73, the CPU 81 depicts the pattern image D in the virtual display region V on the basis of the needle drop positions read from the pattern data (the practical data). The image data of the pattern image D may be included in the pattern data in advance. The CPU 81 may read the image data of the pattern image D from the pattern data and depict the pattern image D in the virtual display region V.

The border image F surrounds the periphery of the pattern image D and forms a border. A gap may be provided between the border image F and the pattern image D such that the border image F and the pattern image D are in proximity to each other. Specifically, it is sufficient that the border image F and the pattern image D be adjacent to each other. The border image F is generated by coloring in the space between the contour line extracted from the pattern image D and the outer shape line that is offset from the contour line. For example, the border image F may be generated by thickening, toward the outside, the contour line extracted from the pattern image D by the amount of the border width, and coloring the contour line using the border color. The border image F may be generated as an image obtained by subtracting a region occupied by the pattern image D from an image obtained by outwardly expanding the contour line extracted from the pattern image D and coloring in the inside using the border color.

In the processing at step S20, the CPU 81 identifies the projection image P in the captured image R using the rate of concordance obtained by comparing, in pixel units, the contour extraction image Q1 generated from the projection image P and the contour extraction image Q2 generated from the captured image R. For example, using a known background difference method, the CPU 81 may identify the projection image P in the captured image R by comparing a captured image before the projection of the projection image P with a captured image after the projection of the projection image P.

In the projection image generation processing, the projection image P is generated that includes the pattern image D, the border image F, and the background image B. For example, the sewing machine 1 may generate the projection image P that does not include the border image F and includes only the pattern image D and the background image B. In this case, the background image B is the color other than black, and is disposed adjacent to the pattern image D. The CPU 81 may perform the processing at step S85 in place of the processing from step S77 to step S85, and may perform the following processing in place of the processing from step S15 to step S65. The CPU 81 drives the projector 58 and projects the projection image P onto the work cloth C. The CPU 81 captures an image of the projection range of the work cloth C onto which the projection image P is projected, using the image sensor 57. The CPU 81 extracts the contour line of the pattern image D from the captured image R obtained by the image capture. The CPU 81 extracts the contour line of the pattern image D from the projection image P, and calculates the rate of concordance with the contour line of the pattern image D extracted from the captured image R. The CPU 81 performs processing to identify the projection image P in the captured image R, on the basis of the calculated rate of concordance. When the projection image P cannot be identified in the captured image R, the CPU 81 generates the projection image P in which the color of the background image B has been changed, and once more performs a series of processing including the projection, the contour extraction, and the calculation of the rate of concordance. Each time this series of processing is performed, the CPU 81 stores the rate of concordance and the color of the background image B in the RAM 83. When the projection image P cannot be identified in the captured image R even after repeating the series of processing a predetermined number of times, the CPU 81 generates the projection image P in which the color of the background image B is set as the color with the highest rate of concordance, and projects the projection image P onto the work cloth C. Even when the projection image P is identified in the captured image R, the CPU 81 receives the change of the color of the background image B by the user's panel operation. When the color of the background image B is changed, the CPU 81 projects the projection image P including the background image B with the updated color onto the work cloth C.

In the embroidery mode, when the size of the embroidery pattern is larger than the image capture range of the projector 58, the CPU 81 projects the projection image P including the partial image DD generated from the partial pattern included inside the frame line W. In line with the movement of the frame line W, in the projection image P that is generated once more, the border color of the border image F may be set to be the border color of the initially generated border image F. In this case, a first time flag may be provided in the RAM 83 and in the processing at step S3 shown in FIG. 4, for example, the first time flag may be set to ON. In the processing at step S13, the CPU 81 may perform projection image generation processing shown in FIG. 17. Note that, in the projection image generation processing shown in FIG. 17, the same step numbers are assigned to the same processing as the projection image generation processing (refer to FIG. 7) of the above-described embodiment, and new step numbers are assigned to processing added for the present modified example.

Figure 17:
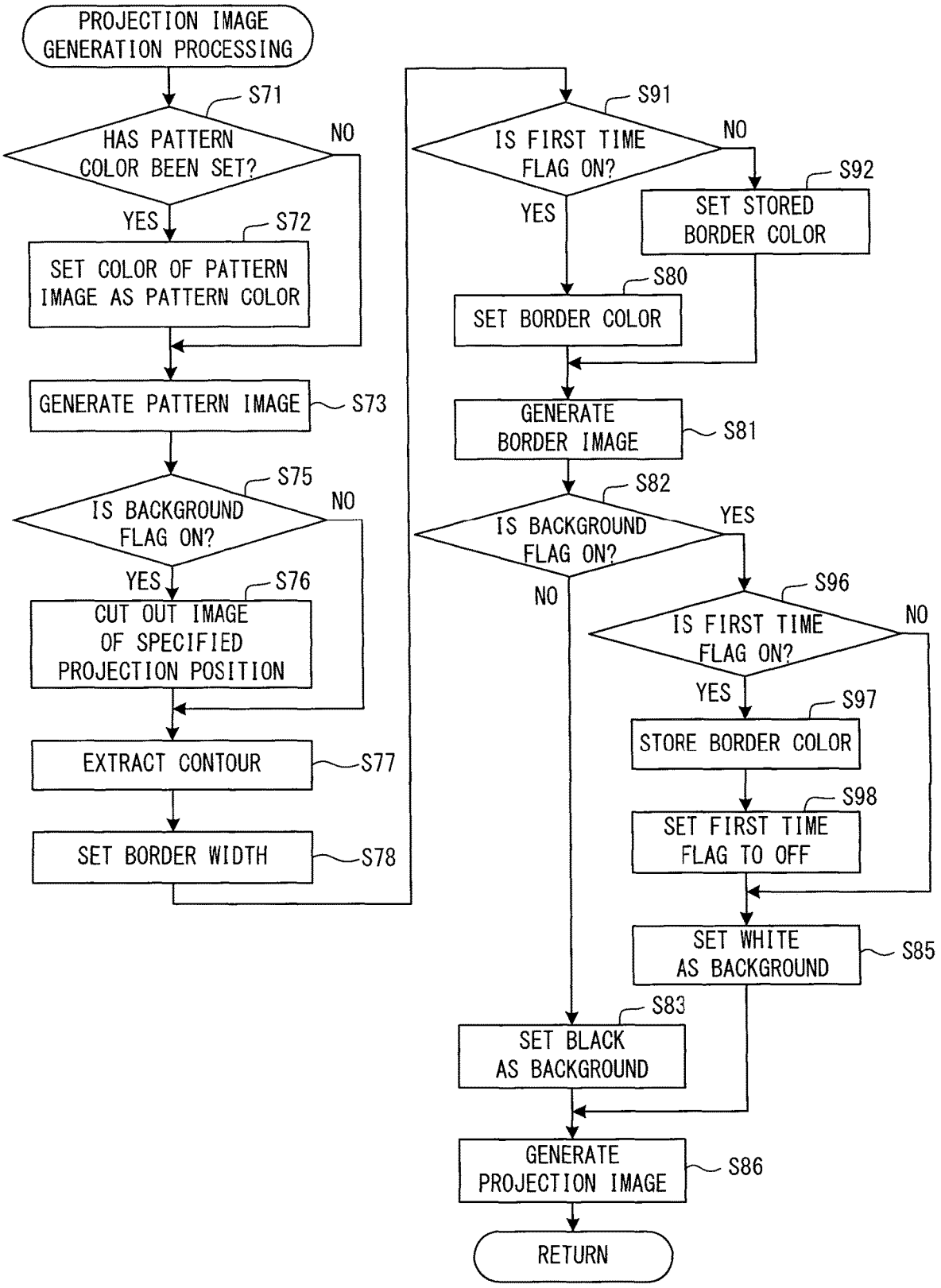
FIG. 17 is a flowchart of a modified example of the projection image generation processing.

As shown in FIG. 17, in the projection image generation processing in the embroidery mode, the CPU 81 generates the pattern image D on the basis of the pattern color, or the thread color data of the embroidery data (step S73). When the size of the embroidery pattern is larger than the projection range of the projector 58, the background flag is ON (yes at step S75). Thus, the CPU 81 cuts out, from the pattern image D, the partial image DD that is the image of the section corresponding to the projection position (step S76), and extracts the contour line (step S77). The CPU 81 sets the border width (step S78). If the first time flag is ON (yes at step S91), the CPU 81 sets the border color in the same way as the above-described embodiment (step S80). The CPU 81 generates a border image (step S81). The CPU 81 stores the set border color in the RAM 83 (yes at step S82; yes at step S96; step S97), and sets the first time flag to OFF (step S98). The CPU 81 generates the projection image P in which the partial image DD, the border image F, and the white background image B are depicted (step S85; step S86).

When the user moves the frame line W and changes the projection position of the embroidery pattern, the CPU 81 generates the partial image DD obtained by cutting out the section corresponding to the projection position (step S76). When generating the border image F, the first time flag is OFF (no at step S91), and thus, the CPU 81 sets the border color stored in the RAM 83 (step S92). Further, since the first time flag is OFF (no at step S96), the CPU 81 generates the projection image P without overwriting and storing the border color (step S86). In the determination at step S41 shown in FIG. 5, if the first time flag is OFF, regardless of the number of color changes, the CPU 81 advances the processing to step S43. Further, in the determination at step S52 shown in FIG. 6, if the first time flag is OFF, the CPU 81 advances the processing to step S55 without receiving the change of the border color. In this way, even if the section specified as the partial image is changed, the sewing machine 1 does not need to set the border color again, and thus, a calculation load to set the border color can be reduced.

The border image F and the background image B are not limited to the case where they are arranged so as to surround the entire pattern image D. The border image F and the background image B may be arranged so as to surround a part of the pattern image D.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing machine that sews a sewing pattern on a work cloth, the sewing machine comprising:

a [storage portion configured to store] *memory that stores* pattern data used for sewing the sewing pattern on the work cloth;

a projector configured to project an image;

[a processor;] and a [memory configured to store computer-readable instructions that, when executed by the processor, instruct the processor] *processor programmed* to perform processes comprising:

generating, on [the] *a* basis of the *stored* pattern data, a projection image that includes a pattern object *representing the sewing pattern that will be sewn on the work cloth* and a peripheral object, [the pattern object representing the sewing pattern,] *that is not part of the sewing pattern and will not be sewn on the work cloth*, the peripheral object being disposed adjacent to an outer edge of the pattern object and surrounding the pattern object; and controlling the projector to project the generated projection image toward a top surface of a bed portion on which the work cloth is placed.

2. The sewing machine according to claim 1, wherein the [computer-readable instructions further instruct the] processor *is programmed* to perform processes comprising:

extracting a contour portion that is [the] *an* outer edge portion of the pattern object; and setting a border color that is a color of a border object that is adjacent to the extracted contour portion and that borders the pattern object, and the peripheral object includes the border object having the set border color.

3. The sewing machine according to claim 2, wherein the [computer-readable instructions further instruct the] processor *is programmed* to perform a process comprising:

changing the border color of the border object included in the projection image, when the projection image is generated, and the setting of the border color includes setting the changed color as the border color when the border color is changed.

4. The sewing machine according to claim 3, further comprising:

an image capture portion [configured to capture an image of the top surface of the bed portion], wherein the [computer-readable instructions further instruct the] processor *is programmed* to perform processes comprising:

controlling the image capture portion to capture an image of the work cloth, which is placed on the top surface of the bed portion and onto which the projection image is projected by the projector; and identifying a section including the projection image, in [a] *the* captured image, and the changing of the border color includes changing the border color when the section including the projection image cannot be identified.

5. The sewing machine according to claim 4, wherein the [computer-readable instructions further instruct the] processor *is programmed* to perform a process comprising:

setting a border width that is a width of [a] *the* border object that is adjacent to the extracted contour portion and that borders the pattern object; *and* changing the border width of the border object included in the projection image when the projection image is generated, and the setting of the border width includes setting the changed width as the border width when the border width is changed.

6. The sewing machine according to claim 5, wherein the changing of the border width includes changing the border width to a width larger than that before the change when the section including the projection image cannot be identified.

7. The sewing machine according to claim 4, wherein the [computer-readable instructions further instruct the] processor *is programmed* to perform a process comprising:

extracting [a boundary portion of an area partitioned by color, from each of the captured image and the projection image] *a portion of the captured image including a boundary and a portion of the projection image including a boundary*, and the identifying of the section including the projection image includes identifying the section including the projection image, in the captured image, by comparing the [boundary] portion extracted from the captured image and the [boundary] portion extracted from the projection image.

8. The sewing machine according to claim 1, wherein the [computer-readable instructions further instruct the] processor *is programmed* to perform processes comprising:

extracting a contour portion that is [the] *an* outer edge portion of the pattern object; *and* setting a border width that is a width of a border object that is adjacent to the extracted contour portion and that borders the pattern object; and the peripheral object includes the border object having the set border width.

9. The sewing machine according to claim 8, wherein the [computer-readable instructions further instruct the] processor *is programmed* to perform a process comprising:

changing the border width of the border object included in the projection image when the projection image is generated, and the setting of the border width includes setting the changed width as the border width when the border width is changed.

10. The sewing machine according to claim 9, further comprising:

an image capture portion [configured to capture an image of the top surface of the bed portion], wherein the [computer-readable instructions further instruct the] processor *is programmed* to perform processes comprising:

controlling the image capture portion to capture an image of the work cloth, which is placed on the top surface of the bed portion and onto which the projection image is projected by the projector; and identifying a section including the projection image, in [a] *the* captured image, and the changing of the border width includes changing the border width to a width larger than that border the change when the section including the projection image cannot be identified.

11. The sewing machine according to claim 10, wherein the [computer-readable instructions further instruct the] processor *is programmed* to perform a process comprising:

extracting [a boundary portion of an area partitioned by color, from each of the captured image and the projection image] *a portion of the captured image including a boundary and a portion of the projection image including a boundary*, and the identifying of the section including the projection image includes identifying the section including the projection image, in the captured image, by comparing the [boundary] portion extracted from the captured image and the [boundary] portion extracted from the projection image [in pixel units].

12. The sewing machine according to claim 1, wherein the sewing pattern is a practical pattern in which a unit pattern is repeatedly sewn, the unit pattern being a pattern of a predetermined shape that is formed by a plurality of stitches, the pattern data is data used to sew the single unit pattern forming the practical pattern, and the generating of the projection image includes generating the projection image in which an object formed by the plurality of continuous single unit patterns is used as the pattern object.

13. The sewing machine according to claim 12, wherein the [computer-readable instructions further instruct the] processor *is programmed* to perform a process comprising:

changing a pattern color, which is a color of the pattern object included in the projection image, when the projection image is generated, and the generating of the projection image includes generating the projection image including the pattern object having the changed pattern color when the pattern color is changed.

14. The sewing machine according to claim 1, wherein the sewing pattern is an embroidery pattern in which a pattern is sewn using embroidery threads of a plurality of colors, the [computer-readable instructions further instruct the] processor *is programmed* to perform a process comprising:

changing a pattern color that is a color of the pattern object, and the generating of the projection image includes generating the projection image including the pattern object formed of only the changed pattern color when the pattern color is changed.

15. The sewing machine according to claim 1, wherein the peripheral object includes a background object representing a background surrounding the pattern object, in a whole projection range that is a range over which the projector is able to project the projection image.

16. The sewing machine according to claim 15, wherein the peripheral object includes a border object and the background object, the border object being adjacent to the outer edge of the pattern object, the background object being adjacent to an outer edge of the border object.

17. The sewing machine according to claim 16, wherein the [computer-readable instructions further instruct the] processor *is programmed* to perform processes comprising:

extracting a contour portion that is [the] *an* outer edge portion of the pattern object;

setting a border width that is a width of [a] *the* border object that is adjacent to the extracted contour portion and that is a color of the border object[,]*; and* setting a border color that is a color of the border object, and the peripheral object includes the border object and the background object, the border object having the set border width and the set border color, the background object being adjacent to [an] *the* outer edge of the border object.

18. The sewing machine according to claim 1, wherein the sewing pattern is an embroidery pattern in which a pattern is sewn using embroidery threads of a plurality of colors, the peripheral object includes a background object representing a background surrounding the pattern object, in a whole projection range that is a range over which the projector is able to project the projection image, the [computer-readable instructions further instruct the] processor *is programmed* to perform processes comprising:

determining whether the sewing pattern is larger than the projection range; and when the sewing pattern is determined to be larger than the projection range, receiving specification of a partial pattern that is a section of the sewing pattern that is within the projection range, and the generating of the projection image includes generating the projection image including the pattern object representing the partial pattern and the background object.

19. The sewing machine according to claim 2, wherein the sewing pattern is an embroidery pattern in which a pattern is sewn using embroidery threads of a plurality of colors, the peripheral object includes a background object representing a background surrounding the pattern object, in a whole projection range that is a range over which the projector is able to project the projection image, the [computer-readable instructions further instruct the] processor *is programmed* to perform processes comprising:

determining whether the sewing pattern is larger than the projection range;

when the sewing pattern is determined to be larger than the projection range, receiving specification of a partial pattern that is a section of the sewing pattern that is within the projection range; and storing the set border color, the generating of the projection image includes generating the projection image including the pattern object representing the partial pattern, in the receiving of the specification, the section specified as the partial pattern, among sections of the sewing pattern, is changeable, and the setting of the border color includes, when the border color is stored, setting the stored border color as the color of the border object bordering the pattern object representing the changed partial pattern.

20. A sewing machine that sews a sewing pattern on a work cloth, the sewing machine comprising:

a [storage portion] memory [configured to store] that stores pattern data used for sewing the sewing pattern on the work cloth;

a projector configured to project an image;

[a processor;] and a [memory configured to store computer-readable instructions that, when executed by the processor, instruct the processor] *processor programmed* to perform processes comprising:

generating, on [the] *a* basis of the pattern data, a projection image that includes a pattern object *representing the sewing pattern that will be sewn on the work cloth,* and a [peripheral] *border* object [the pattern object representing the sewing pattern,] *that is not part of the sewing pattern and will not be sewn on the work cloth*, the border object being disposed adjacent to an outer edge of the pattern object and bordering the pattern object; and controlling the projector to project the generated projection image toward a top surface of a bed portion on which the work cloth is placed.

*21. A sewing machine that sews a sewing pattern on a work cloth, the sewing machine comprising:*

*a memory that stores pattern data used for sewing the sewing pattern on the work cloth;*

*a projector configured to project an image; and*

*a processor programmed to perform processes comprising:*

*determining whether to project a background object representing a background of a pattern object representing the sewing pattern;*

*generating a projection image that includes:*

*the pattern object representing the sewing pattern that will be sewn on the work cloth, and*

*the background object that is not part of the sewing pattern and will not be sewn on the work cloth, wherein*

*when determining that the background object is not to be projected, the projection image that includes the background object of a black color is generated, and*

*when determining that the background object is to be projected, the projection image that includes the background object of a color other than the black color is generated; and*

*controlling the projector to project the generated projection image.*

*22. The sewing machine according to claim 21, wherein*

*the sewing pattern is an embroidery pattern or a practical pattern, the practical pattern being formed by repeatedly sewing a unit pattern, the unit pattern being a pattern of a predetermined shape that is formed by a plurality of stitches, and*

*when the sewing pattern is the practical pattern, the processor determines that the background object is not to be projected.*

*23. The sewing machine according to claim 21, wherein*

*the processor is programmed to perform processes comprising:*

*determining whether the sewing pattern is larger than a projection range that is a range over which the projector projects the projection image; and*

*when the sewing pattern is determined to be larger than the projection range, the processor determines that the background object is to be projected.*

*24. The sewing machine according to claim 21, wherein*

*the processor is programmed to perform processes comprising:*

*receiving a change in the color of the background object included in the projection image, and*

*when the change in the color of the background object is received, the projection image that includes the background object of the changed color is generated.*

*25. A sewing machine that sews a sewing pattern on a work cloth, the sewing machine comprising:*

*a memory that stores pattern data used for sewing the sewing pattern on the work cloth;*

*a projector configured to project an image; and*

*a processor programmed to perform processes comprising:*

*controlling the projector to project a projection image that includes:*

*a pattern object representing the sewing pattern that will be sewn on the work cloth, and*

*a background object representing a background of the pattern object and that is not part of the sewing pattern and will not be sewn on the work cloth; and*

*receiving a change in a color of the background object included in the projection image that is projected, wherein*

*when the change in the color of the background object is received, the projection image that includes the pattern object and the background object of the changed color is projected.*

*26. The sewing machine according to claim 25, wherein the processor is programmed to perform processes comprising:*

*generating the projection image that includes the pattern object and the background object of the changed color, wherein*

*the generated projection image is projected.*

*27. The sewing machine according to claim 25, further comprising: a touch panel that receives input operation by a user, wherein*

*the change in the color of the background object is received via the touch panel.*

*28. The sewing machine according to claim 25, further comprising:*

*an image capture portion, wherein*

*the processor is programmed to perform processes comprising:*

*controlling the image capture portion to capture an image of the work cloth, which is placed on the top surface of the bed portion and onto which the projection image is projected by the projector; and*

*identifying a section including the projection image, in the captured image, and*

*when the section including the projection image cannot be identified, the change in the color of the background object is received.*

*29. The sewing machine according to claim 26, wherein the projection image that includes the background object of a black color is generated.*

*30. The sewing machine according to claim 26, wherein the projection image that includes the background object of a white color is generated.*

*31. A sewing machine that sews a sewing pattern on a work cloth, the sewing machine comprising:*

*a memory that stores pattern data used for sewing the sewing pattern on the work cloth;*

*a projector configured to project an image; and*

*a processor programmed to perform processes comprising:*

*controlling the projector to project a projection image that includes:*

*a pattern object representing the sewing pattern that will be sewn on the work cloth, and*

*a background object representing a background of the pattern object and that is not part of the sewing pattern and will not be sewn on the work cloth;*

*changing a color of the pattern object included in the projection image that is projected;*

*when the color of the pattern object is changed, projecting the projection image including the pattern object of the changed color; and*

*receiving, when the projection image is projected, a change in the color of the background object that is included in the projection image, wherein*

*when the change in the color of the background object is received, the projection image that includes the background object of the changed color and the pattern object is projected.*

*32. The sewing machine according to claim 31, wherein the processor is programmed to perform processes comprising:*

*generating the projection image that includes the pattern object of the changed color when the color of the pattern object is changed, wherein*

*the generated projection image is projected.*

*33. The sewing machine according to claim 31, wherein the sewing pattern is a practical pattern formed by repeatedly sewing a unit pattern, the unit pattern being a pattern of a predetermined shape that is formed by a plurality of stitches.*

*34. The sewing machine according to claim 31, further comprising:*

*a display; and*

*an operating portion that receives input operation by a user, wherein*

*the processor is programmed to perform processes comprising:*

*displaying colors to be candidates for the color of the pattern object on the display, and*

*when a color is selected from among the colors to be candidates via the operating portion, the color of the pattern object is changed to the selected color.*

*35. The sewing machine according to claim 34, wherein the colors to be candidates for the color of the pattern object are displayed on the display using a color circle chart.*

*36. The sewing machine according to claim 34, wherein the operating portion is a touch panel.*

*37. A sewing machine that sews a sewing pattern on a work cloth, the sewing machine comprising:*

*a projector; and*

*a processor programmed to perform processes comprising:*

*controlling the projector to project a projection image, the projection image including a pattern object representing the sewing pattern and a peripheral object that is not part of the sewing pattern and is not sewn on the work cloth, the peripheral object being disposed adjacent to and contacting an outer edge of the pattern object and surrounding the pattern object.*

*38. The sewing machine of claim 21, wherein the process of determining whether to project a background object representing the background of the pattern object representing the sewing pattern comprises:*

*when a background flag is set to OFF, it is determined that the background image is not to be projected; and*

*when the background flag is set to ON, it is determined that the background image is to be projected.*

*39. The sewing machine of claim 25, further comprising:*

*a touch panel,*

*wherein the process of receiving a change in a color of the background object comprises receiving an operation from a user on the touch panel that causes the processor to change setting of a background flag from OFF to ON or from ON to OFF.*

* * * * *